United States Patent
Ju

(10) Patent No.: US 12,462,536 B2
(45) Date of Patent: Nov. 4, 2025

(54) METHOD AND ELECTRONIC DEVICE FOR TRAINING NEURAL NETWORK MODEL BY AUGMENTING IMAGE REPRESENTING OBJECT CAPTURED BY MULTIPLE CAMERAS

(71) Applicant: SAMSUNG ELECTRONICS CO., LTD., Suwon-si (KR)

(72) Inventor: Jaeyong Ju, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 89 days.

(21) Appl. No.: 18/384,549

(22) Filed: Oct. 27, 2023

(65) Prior Publication Data

US 2024/0135686 A1 Apr. 25, 2024
US 2024/0233340 A9 Jul. 11, 2024

Related U.S. Application Data

(63) Continuation of application No. PCT/KR2023/016525, filed on Oct. 24, 2023.

(30) Foreign Application Priority Data

Oct. 24, 2022 (KR) .................... 10-2022-0137781
Dec. 6, 2022 (KR) .................... 10-2022-0169100

(51) Int. Cl.
*G06V 10/82* (2022.01)
*G06T 7/80* (2017.01)
(Continued)

(52) U.S. Cl.
CPC ............. *G06V 10/774* (2022.01); *G06T 7/80* (2017.01); *G06V 10/82* (2022.01); *G06V 20/70* (2022.01);
(Continued)

(58) Field of Classification Search
CPC ...... G06V 10/774; G06V 20/70; G06V 10/82; G06T 7/80; G06T 2207/20081;
(Continued)

(56) References Cited

U.S. PATENT DOCUMENTS

| 8,115,814 B2 | 2/2012 | Iwase et al. |
| 10,592,771 B2 | 3/2020 | Astrom et al. |

(Continued)

FOREIGN PATENT DOCUMENTS

| CN | 114627173 A | 6/2022 |
| JP | 2021-163503 A | 10/2021 |

(Continued)

OTHER PUBLICATIONS

International Search Report dated Feb. 16, 2024 in International Application No. PCT/KR2023/016525.
(Continued)

*Primary Examiner* — Zaihan Jiang
(74) *Attorney, Agent, or Firm* — Sughrue Mion, PLLC

(57) ABSTRACT

Provided is a computer-implemented method of training a neural network model by augmenting images representing objects. The method includes: obtaining a first object recognition result predicted by a first neural network model using, as an input, a first image captured by a first camera capturing, from a first viewpoint, a space including at least one object; converting the obtained first object recognition result, based on a conversion relationship between a first camera coordinate system corresponding to the first camera and a second camera coordinate system corresponding to a second camera capturing, from a second viewpoint, the space; generating, based on the first object recognition result converted with respect to the second viewpoint, training data by performing labeling on a second image that corresponds to the first image, the second image being captured by the (Continued)

second camera; and training a second neural network model by using the generated training data.

20 Claims, 24 Drawing Sheets

(51) Int. Cl.
*G06V 10/774* (2022.01)
*G06V 20/70* (2022.01)
*H04N 23/90* (2023.01)

(52) U.S. Cl.
CPC ... *H04N 23/90* (2023.01); *G06T 2207/20081* (2013.01); *G06T 2207/20084* (2013.01); *G06T 2207/30204* (2013.01); *G06T 2207/30244* (2013.01)

(58) Field of Classification Search
CPC . G06T 2207/20084; G06T 2207/30204; G06T 2207/30244; H04N 23/90
See application file for complete search history.

(56) References Cited

U.S. PATENT DOCUMENTS

| | | | |
|---|---|---|---|
| 10,839,203 B1* | 11/2020 | Guigues | G06T 7/292 |
| 11,030,442 B1* | 6/2021 | Bergamo | G06F 18/214 |
| 11,232,294 B1* | 1/2022 | Banerjee | G06T 7/246 |
| 11,284,041 B1* | 3/2022 | Bergamo | G06T 7/251 |
| 11,295,475 B2 | 4/2022 | Kalra et al. | |
| 11,475,589 B2 | 10/2022 | Tang et al. | |
| 11,610,373 B2 | 3/2023 | Jeong et al. | |
| 12,131,539 B1* | 10/2024 | Broaddus | G06V 10/82 |
| 2004/0163562 A1* | 8/2004 | Lewis, Jr. | B41F 33/0081 |
| | | | 101/485 |
| 2019/0138786 A1 | 5/2019 | Trenholm et al. | |
| 2019/0325638 A1* | 10/2019 | Lucas | G06T 7/55 |
| 2020/0019156 A1 | 1/2020 | Drew et al. | |
| 2020/0226421 A1* | 7/2020 | Almazan | G06N 3/045 |
| 2020/0356813 A1 | 11/2020 | Sharma et al. | |
| 2020/0380699 A1 | 12/2020 | Amo | |
| 2021/0019507 A1* | 1/2021 | Brookshire | G06V 10/764 |
| 2021/0158032 A1 | 5/2021 | Baek et al. | |
| 2021/0374402 A1* | 12/2021 | Kim | G06V 10/82 |
| 2022/0383041 A1 | 12/2022 | Ning et al. | |

FOREIGN PATENT DOCUMENTS

| | | |
|---|---|---|
| JP | 2022-92685 A | 6/2022 |
| KR | 10-1876543 B1 | 7/2018 |
| KR | 10-2020-0069911 A | 6/2020 |
| KR | 10-2198851 B1 | 1/2021 |
| KR | 10-2021-0056974 A | 5/2021 |
| KR | 10-2021-0063995 A | 6/2021 |
| KR | 10-2022-0072499 A | 6/2022 |
| KR | 10-2022-0132617 A | 9/2022 |
| WO | 2018/180454 A1 | 10/2018 |

OTHER PUBLICATIONS

Extended European Search Report dated Oct. 1, 2025, in European Patent Application No. 23883048.3, 8 pages.

* cited by examiner

| | Movability Level | Position Movement Cycle | Height |
|---|---|---|---|
| THIRD LAYER | ML4 | Within 1 Week | More than 2m |
| SECOND LAYER | ML3 ML2 | Within 1 month | 1m ~ 2m |
| FIRST LAYER | ML1 | 1 month or more | 1m or less |

METHOD AND ELECTRONIC DEVICE FOR TRAINING NEURAL NETWORK MODEL BY AUGMENTING IMAGE REPRESENTING OBJECT CAPTURED BY MULTIPLE CAMERAS

CROSS-REFERENCE TO RELATED APPLICATIONS

This application is a by-pass continuation application of International Application No. PCT/KR2023/016525, filed on Oct. 24, 2023, which is based on and claims priority to Korean Patent Application Nos. 10-2022-0137781, filed on Oct. 24, 2022, and 10-2022-0169100, filed on Dec. 6, 2022, in the Korean Intellectual Property Office, the disclosures of which are incorporated by reference herein their entireties.

BACKGROUND

1. Field

The disclosure relates to a method and electronic device for training a neural network model by augmenting images representing objects captured by multiple cameras.

2. Description of the Related Art

The Internet has evolved from a human-centered connection network, through which humans generate and consume information, to an Internet-of-Things (IoT) network that exchanges and processes information between distributed elements such as objects. Internet-of-Everything (IoE) technology has also emerged, in which big data processing technology or the like is combined with IoT technology via a connection with a cloud server. IoT technology may be applied to various fields, such as smart home appliances, smart homes, smart buildings, or smart cities, via the convergence and combination of existing information technologies and various industries.

Electronic devices connected in an IoT environment may collect, generate, analyze, or process data, share the data with each other, and utilize the data for their tasks. Recently, with the rapid progress in computer vision, various types of electronic devices that utilize neural network models for performing vision tasks have been developed. Accordingly, interest in the connection between various types of electronic devices in IoT environments is increasing.

SUMMARY

According to an aspect of the disclosure, provided is a computer-implemented method of training a neural network model by augmenting images representing objects captured by multiple cameras, the method includes obtaining a first object recognition result predicted by a first neural network model using, as an input, a first image captured by a first camera capturing, from a first viewpoint, a space including at least one object, the method includes converting the obtained first object recognition result, based on a conversion relationship between a first camera coordinate system corresponding to the first camera and a second camera coordinate system corresponding to a second camera capturing, from a second viewpoint, the space, the method includes generating, based on the first object recognition result converted with respect to the second viewpoint, training data by performing labeling on a second image that corresponds to the first image, the second image being captured by the second camera, and the method includes training a second neural network model by using the generated training data.

According to an aspect of the disclosure, an electronic device includes a camera, a communication unit, a memory configured to store at least one instruction, at least one processor operatively connected to the camera, the communication unit, and the memory, the at least one processor configured to execute the at least one instruction to obtain, through the communication unit, a first object recognition result predicted by a first neural network model using, as an input, a first image captured from a first viewpoint by a camera of an external device capturing a space including at least one object, the at least one processor configured to execute the at least one instruction to convert the obtained first object recognition result, based on a conversion relationship between a first camera coordinate system corresponding to the camera of the external device and a second camera coordinate system corresponding to the camera capturing, from a second viewpoint, the space, the at least one processor configured to execute the at least one instruction to generate training data by performing labeling on a second image that corresponds to the first image, the second image being captured by the camera, based on the first object recognition result converted with respect to the second viewpoint, and the at least one processor configured to execute the at least one instruction to train a second neural network model by using the generated training data.

According to an aspect of the disclosure, a cloud server includes a communication unit, a memory storing at least one instruction, at least one processor operatively connected to the communication unit and the memory, the at least one processor configured to execute the at least one instruction to obtain a first object recognition result predicted by a first neural network model using, as an input, a first image captured by a first camera capturing a space including at least one object from a first viewpoint, the at least one processor configured to execute the at least one instruction to obtain, through the communication unit, a second image captured by a second camera capturing the space from a second viewpoint, the at least one processor configured to execute the at least one instruction to convert the obtained first object recognition result, based on a conversion relationship between a first camera coordinate system corresponding to the first camera and a second camera coordinate system corresponding to the second camera, the at least one processor configured to execute the at least one instruction to generate training data by performing labeling on the second image corresponding to the first image, based on the first object recognition result converted with respect to the second viewpoint, and the at least one processor configured to execute the at least one instruction to train a second neural network model by using the generated training data.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
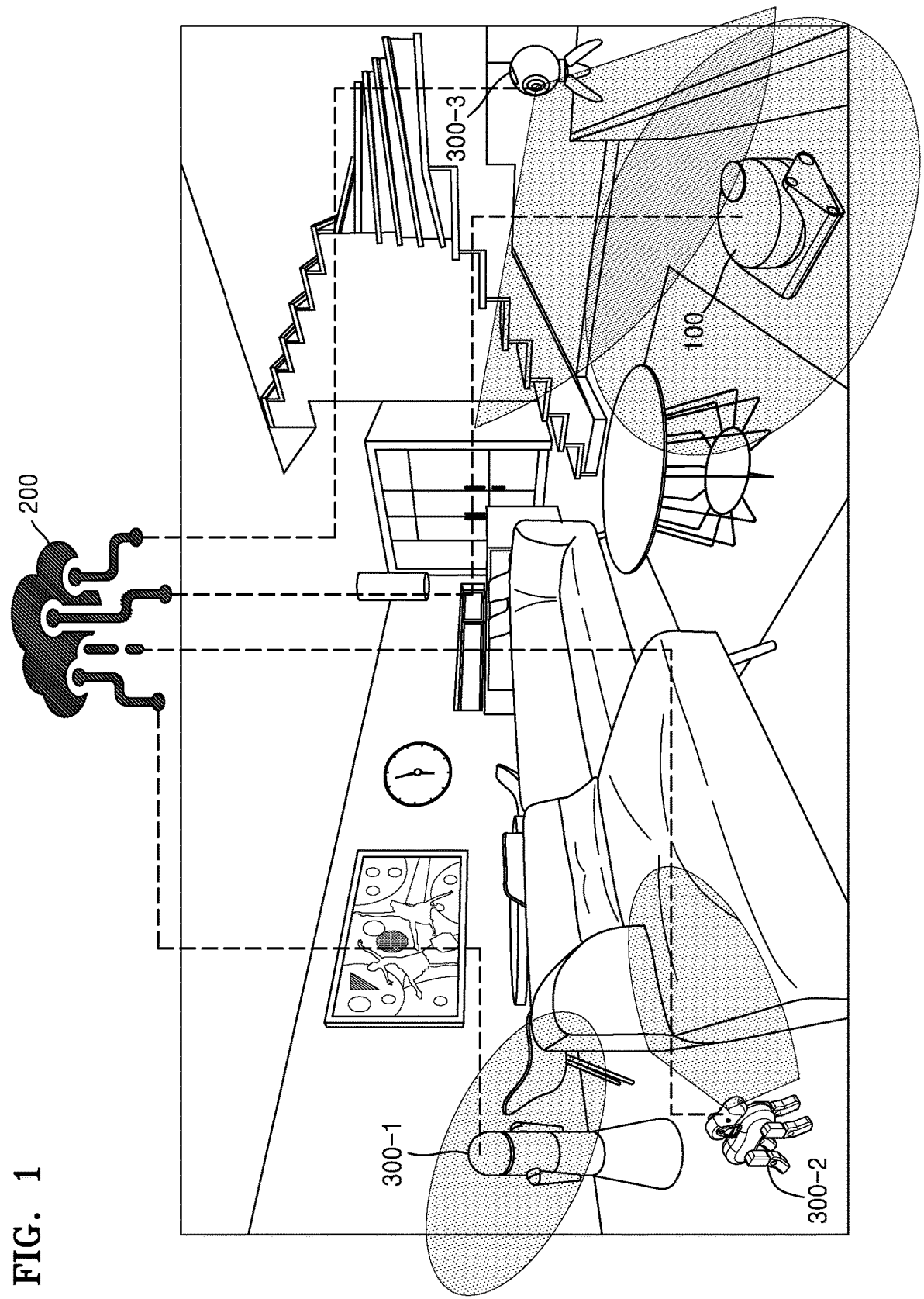
FIG. 1 illustrates an in-home Internet-of-Things (IoT) environment in which an electronic device and external devices are connected to each other, according to an embodiment of the disclosure.

The terms used herein will be briefly described, and then the disclosure will be described in detail. As used herein, the term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. The expression "at least one of a, b, or c" may indicate only a, only b, only c, both a and b, both a and c, both b and c, all of a, b, and c, or variations thereof. Similarly, the term "set" means one or more. Accordingly, the set of items may be a single item or a collection of two or more items.

Although the terms used herein are selected from among common terms that are currently widely used in consideration of their functions in the disclosure, the terms may be different according to an intention of one of ordinary skill in the art, a precedent, or the advent of new technology. In addition, in certain cases, there are also terms arbitrarily selected by the applicant, and in this case, the meaning thereof will be defined in detail in the description. Therefore, the terms used herein are not merely designations of the terms, but the terms are defined based on the meaning of the terms and content throughout the disclosure.

The singular expression may also include the plural meaning as long as it is not inconsistent with the context. All the terms used herein, including technical and scientific terms, may have the same meanings as those generally understood by those of skill in the art. In addition, although the terms such as 'first' or 'second' may be used herein to describe various elements, these elements should not be limited by these terms. These terms are only used to distinguish one element from another element.

Throughout the specification, as used herein, the terms such as "... er (or)", "... unit", "... module", etc., denote a unit that performs at least one function or operation, which may be implemented as hardware or software or a combination thereof.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as Read Only Memory (ROM), Random Access Memory (RAM), a hard disk drive, a Compact Disc (CD), a Digital Video Disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Functions related to artificial intelligence, according to the disclosure, are performed by a processor and a memory. The processor may include one or more processors. In this case, the one or more processors may be a general-purpose processor, such as a central processing unit (CPU), an application processor (AP), or a digital signal processor (DSP), a dedicated graphics processor, such as a graphics processing unit (GPU) or a vision processing unit (VPU), or a dedicated artificial intelligence processor, such as a neural processing unit (NPU). The one or more processors perform control to process input data according to predefined operation rules or an artificial intelligence model stored in the memory. Alternatively, in a case the one or more processors are dedicated artificial intelligence processors, the dedicated artificial intelligence processor may be designed with a hardware structure specialized for processing a particular artificial intelligence model.

The predefined operation rules or artificial intelligence model may be generated via a training process. Here, being generated via a training process may mean that predefined operation rules or artificial intelligence model set to perform desired characteristics (or purposes), is generated by training a basic artificial intelligence model by using a learning algorithm that utilizes a large amount of training data. According to the disclosure, the training process may be performed by a device itself on which artificial intelligence is performed or by a separate server or system. Examples of learning algorithms may include supervised learning, unsupervised learning, semi-supervised learning, and reinforcement learning, but are not limited to them.

The artificial intelligence model may include a plurality of neural network layers. Each of the neural network layers has a plurality of weight values, and performs a neural network arithmetic operation via an arithmetic operation between an arithmetic operation result of a previous layer and the plurality of weight values. A plurality of weight values in each of the neural network layers may be optimized by a result of training the artificial intelligence model. For example, the plurality of weight values may be refined to reduce or minimize a loss or cost value obtained by the artificial intelligence model during the training process. The artificial neural network may include, for example, a deep neural network (DNN) and may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-networks (DQN), or the like, but is not limited thereto.

Hereinafter, an embodiment of the disclosure will be described in detail with reference to the accompanying drawings to allow those of skill in the art to easily carry out the embodiment of the disclosure. The disclosure may, however, be embodied in many different forms and should not be construed as being limited to an embodiment of the disclosure set forth herein.

Hereinafter, the disclosure will be described in detail with reference to the accompanying drawings.

FIG. 1 is a diagram illustrating an in-home Internet-of-Things (IoT) environment in which an electronic device 100 and external devices are connected.

In an embodiment, the electronic device 100 is a robot vacuum cleaner. In some embodiments, the electronic device 100 may be various types of assistant robots for user convenience, mobile devices, augmented reality (AR) devices, virtual reality (VR) devices, or devices for detecting surrounding environments and providing certain services in a particular location or space. The electronic device 100 may be equipped with various types of sensors for scanning a space (e.g., an area, a chamber, a room) and detecting an object in the space, and a neural network model. For example, the electronic device 100 may include at least one of an image sensor such as a camera, a light detection and ranging (LiDAR) sensor such as a laser distance sensor (LDS), or a time-of-flight (ToF) sensor. The electronic device 100 may be equipped with at least one model such as a DNN, a CNN, an RNN, or a BRDNN, and may use a combination of them.

The external devices connected to the electronic device 100 include a cloud server 200 and various types of IoT devices 300-1, 300-2, and 300-3. As illustrated in FIG. 1, the IoT devices may include a butler robot 300-1, a pet robot 300-2, a smart home camera 300-3, and the like, but are not limited to them, and may be of the same type as the electronic device 100. Each of the butler robot 300-1, the pet robot 300-2, and the smart home camera 300-3 may scan a space and detect an object in the space by using various types of sensors.

According to an embodiment of the disclosure, each of the electronic device 100, the butler robot 300-1, the pet robot 300-2, and the smart home camera 300-3 may generate and store a spatial map as spatial information about a space including at least one object by using collected spatial scan information or object information. The electronic device 100, the butler robot 300-1, the pet robot 300-2, and the smart home camera 300-3 may transmit or receive and store spatial scan information, object information, or a spatial map to share it with each other.

Even when the devices are in the same space, they scan the space and detect an object from different viewpoints and different angles of view depending on the location, performance, or sensing range of each device. Whether each device is stationary or mobile, the operating behavior of each device, etc., and thus, sensing information obtained by any one of the devices, such as an image or an audio, may be useful for training an artificial intelligence model equipped in another device.

According to an embodiment of the disclosure, any one of the electronic device 100, the butler robot 300-1, the pet robot 300-2, and the smart home camera 300-3 may serve as a master device or a server device, and the other devices may serve as slave devices or client devices. The device corresponding to the master device or server device may receive, store, and manage spatial scan information, object information, or spatial maps from other IoT devices. The device corresponding to the master device or server device may classify, store, and manage the received information according to the position at which the information is obtained. For example, the device corresponding to the master device or server device may classify, collect, and manage spatial scan information, object information, or spatial maps according to whether such information corresponds to the same space, zone, or area. The device corresponding to the master device or server device may update first information stored therein with second information corresponding to the same position to maintain the up-to-dateness and accuracy of information related to the position.

According to an embodiment of the disclosure, the electronic device 100, the butler robot 300-1, the pet robot 300-2, and the smart home camera 300-3 may transmit spatial scan information, object information, or spatial maps to the cloud server 200 to store and manage the spatial scan information, object information, or spatial maps through the cloud server 200. For example, when it is impossible to transmit spatial scan information, object information, or a spatial map to the electronic device 100 because the IoT devices are powered off or are performing particular functions, the electronic device 100 may request and receive the spatial scan information, object information, or spatial map from the cloud server 200.

As illustrated in FIG. 1, the cloud server 200 may manage spatial scan information, object information, or a spatial map received from each of the electronic device 100, the butler robot 300-1, the pet robot 300-2, and the smart home camera 300-3, and monitor a space in a home. The cloud server 200 may store and manage spatial scan information, object information, or spatial maps collected from a plurality of IoT devices for each registered user account or registered location. For example, the cloud server 200 may classify, collect, and manage spatial scan information, object information, or spatial maps according to whether such information corresponds to the same space or zone. In response to a request from the electronic device 100, the butler robot 300-1, the pet robot 300-2, or the smart home camera 300-3 located in the home, the cloud server 200 may transmit information about a space in the home, such as a spatial map, to the corresponding device.

According to an embodiment of the disclosure, instead of the cloud server 200, an artificial intelligence (AI) hub (e.g., an AI speaker) located in the home may receive, store, and manage spatial scan information, object information, or spatial maps from IoT devices within the home. The AI hub may store and manage spatial scan information, object information, or spatial maps collected from a plurality of IoT devices for each space or zone within the home.

According to an embodiment of the disclosure, the AI hub located in the home may store and manage spatial scan information, object information, or spatial maps, together with the cloud server 200. For example, the AI hub may process spatial scan information or object information to generate or manage a spatial map, or convert data to protect personal information and transmit the resulting data to the cloud server 200. The cloud server 200 may process information received from the AI hub to store and manage spatial scan information, object information, or spatial maps, and transmit them to the AI hub.

According to an embodiment of the disclosure, the electronic device 100, for example, a robot vacuum cleaner, may use a spatial map to perform a task such as cleaning. To this end, the electronic device 100 may scan a space by using various types of sensors to update a spatial map with up-to-date spatial scan information. The electronic device 100 may update the spatial map stored therein by using not only information sensed by itself but also part or all of the spatial maps received from the cloud server 200, the butler robot 300-1, the pet robot 300-2, and the smart home camera 300-3 that are connected in the in-home IoT environment.

For example, when a robot vacuum cleaner is fully charged at a charging station to clean a space within the home, the robot vacuum cleaner may perform cleaning by using a spatial map stored therein. The robot vacuum cleaner may use the most recently used spatial map to clean the same space. However, because the state of the space at the time of previous cleaning is different from the current state of the space, it is preferable to apply the latest information about objects located in the space to the spatial map in order to perform efficient cleaning. To this end, the robot vacuum cleaner may depart from the charging station to travel a major route in advance and collect information about objects in the space by itself. However, such pre-driving requires more time and battery consumption. In this case, the robot vacuum cleaner may receive an up-to-date spatial map from another robot vacuum cleaner or at least one external device located in the same space to update the spatial map stored therein.

The robot vacuum cleaner may use part or all of the spatial map received from the external device. The robot vacuum cleaner may use a spatial map received from another robot vacuum cleaner of the same type, or may use information about objects whose positions are expected to change frequently, to update the spatial map stored therein. Even when the robot vacuum cleaner receives a spatial map from a device of a different type, the robot vacuum cleaner may use part or all of the spatial map for the same space to update the spatial map stored therein.

Figure 2A:
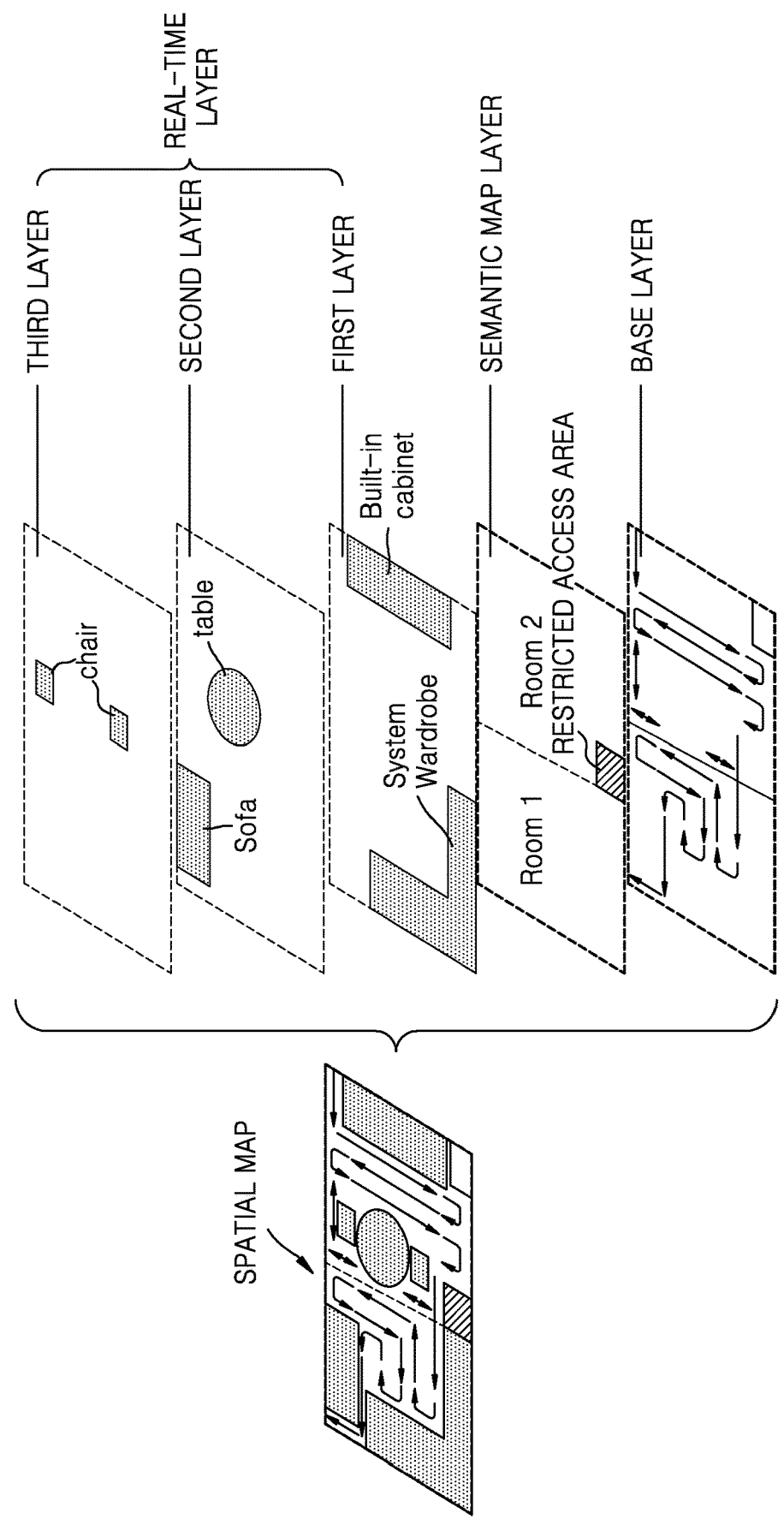
FIGS. 2A and 2B illustrate a spatial map, according to an embodiment of the disclosure.
Figure 2B:
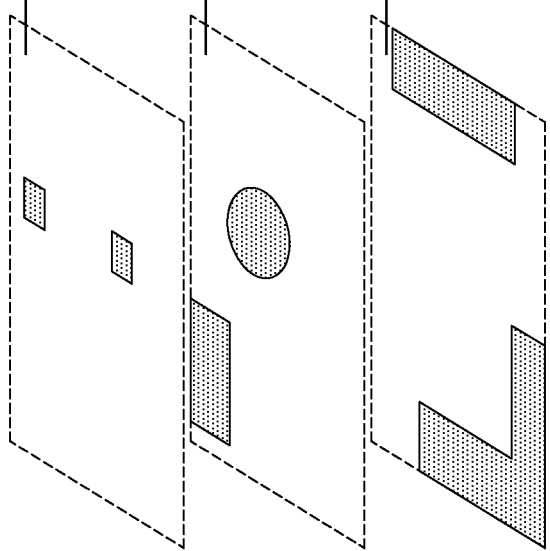

FIGS. 2A and 2B are flowcharts for describing a spatial map.

FIG. 2A illustrates a spatial map stored in the electronic device 100, which is a robot vacuum cleaner, and a hierarchical structure between a plurality of layers constituting the spatial map. As illustrated in FIG. 2A, the spatial map may include a base layer, a semantic map layer, and a real-time layer, but is not limited thereto and may include more or fewer layers depending on the characteristics of a task to be performed.

The base layer provides information about a basic structure of the entire space, including walls, columns, and passages. By processing three-dimensional point cloud data to match coordinate systems with each other, and storing positions, the base layer may provide three-dimensional information about the space, position information and trajectory information of an object, etc. The base layer serves as a base map and a geometric map.

The semantic map layer provides semantic information above the base layer. A user of the electronic device 100 may assign semantic information such as 'Room 1', 'Room 2', or 'Restricted access area' to the basic structure of the entire space of the base layer and use the semantic information for execution of a task of the electronic device 100. For example, given that the electronic device 100 is a robot vacuum cleaner, the user may set semantic information in the semantic map layer such that the robot vacuum cleaner cleans only 'Room 2' or does not clean 'restricted access area'.

The real-time layer provides information about at least one object in the space. The at least one object may include static and dynamic objects. In the disclosure, the real-time layer may include a plurality of layers based on object attribute information, and may have a hierarchical structure between the layers. As illustrated in FIG. 2A, the real-time layer may include a first layer, a second layer, and a third layer, but is not limited thereto, and may include more or fewer layers depending on criteria for classification of attribute information of objects. Referring to FIG. 2A, the first layer includes a system wardrobe and a built-in cabinet, the second layer includes a table and a sofa, and the third layer includes chairs.

FIG. 2B illustrates various examples of real-time layers including a plurality of layers based on attribute information of objects.

The object attribute information may be used for classifying objects according to an objective criterion such as type, shape, size, height, or the like of object, or a combination of a plurality of criteria. In addition, because the object attribute information may vary depending on the user and environment, attribute information of each object may be labeled and input in advance.

According to an embodiment of the disclosure, when the object attribute information is movability level (ML) of object, the first layer may include objects corresponding to ML 1, the second layer may include objects corresponding to ML 2 and ML3, and the third layer may include objects corresponding to ML 4. The movability level of an object may be determined by applying objective characteristics of the object to a predefined classification criterion for evaluating movability. For example, ML 1 corresponds to objects that are not movable, ML 2 corresponds to objects that are movable but mostly stay stationary, ML 3 corresponds to objects that are movable but move occasionally, and ML 4 corresponds to objects that are movable and move frequently.

According to an embodiment of the disclosure, when the object attribute information is a position movement cycle of object, the first layer may include objects that have not moved within one month, the second layer may include objects that have moved within one month, and the third layer may include objects that have moved within one week. Unlike the movability level which is classified based on the objective characteristics of the object, the position movement cycle of the same object may vary depending on a user of the object or the environment in which the object is located. For example, object 'A' may be used frequently by a first user but rarely used by a second user. Object 'B' may be frequently used in a first place but rarely used in a second place.

According to an embodiment of the disclosure, when the object attribute information is a height at which the object is located, the first layer may include objects corresponding to less than 1 m, the second layer may include objects corresponding to 1 m to 2 m, and the third layer may include objects corresponding to greater than 2 m.

According to an embodiment of the disclosure, classification criteria for the plurality of layers included in the real-time layer may be defined by the user. For example, the user may generate a spatial map that reflects the characteristics of a task by combining and setting attribute information of a plurality of types of objects for classification criteria. For example, for a robot vacuum cleaner that typically moves below a height of 50 cm, there is no need to consider objects located higher than 1 m, such as a lamp or a picture frame on a wall. Thus, the user may manually set the criteria for classification of the layers such that the first layer includes objects corresponding to ML 1 and located 1 m or less, the second layer includes objects corresponding to ML 2 or ML 3 and located 1 m or less, and the third layer includes objects corresponding to ML 4 and located 1 m or less.

FIGS. 3A, 3B, 3C, and 3D are diagrams for describing a method of using layers constituting a spatial map.

Depending on the types of the electronic device 100 and IoT devices or the characteristics of a task, spatial maps used by the respective devices may be different from each other. The electronic device 100 may use an existing spatial map stored therein as it is. However, when there is a change in the space in which the task is to be performed, the electronic device 100 may update the spatial map to reflect the change. The electronic device 100 may update the existing spatial map by receiving a spatial map that already reflects the change in the space, from at least one external device. The electronic device 100 may generate a new spatial map based on the existing spatial map.

Figure 3A:
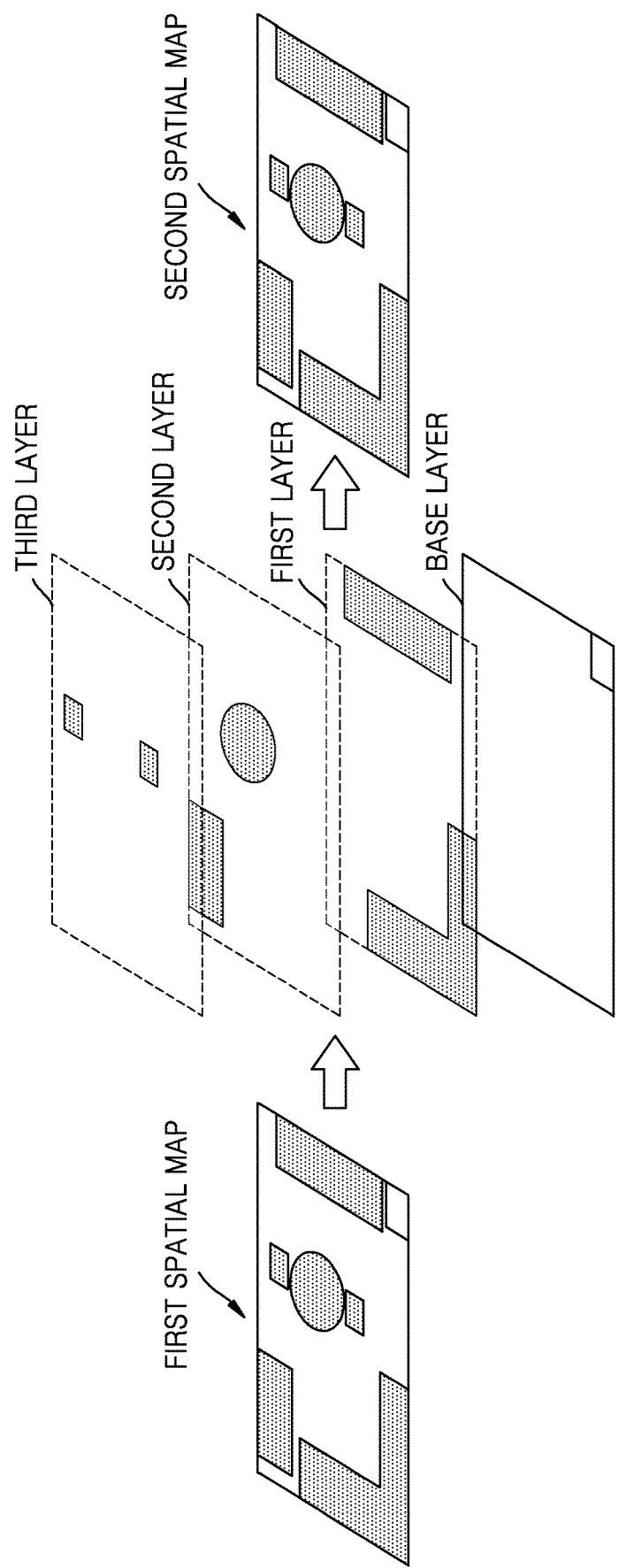
FIGS. 3A, 3B, 3C, and 3D illustrate a method using layers constituting a spatial map, according to an embodiment of the disclosure.

Referring to FIG. 3A, the electronic device 100 may load an existing spatial map (hereinafter, "a first spatial map") stored therein. The first spatial map includes a base layer, a first layer, a second layer, and a third layer. Hereinafter, the first to third layers include objects according to arbitrary classification criteria of FIG. 2B. In a case in which the first spatial map has been generated just a few minutes ago or there is no change in the space after the previous use of the first spatial map, the electronic device 100 may use the first space map as it is to obtain a new space map (hereinafter, referred to as a second space map), and use the second space map to perform a new task.

Figure 3B:
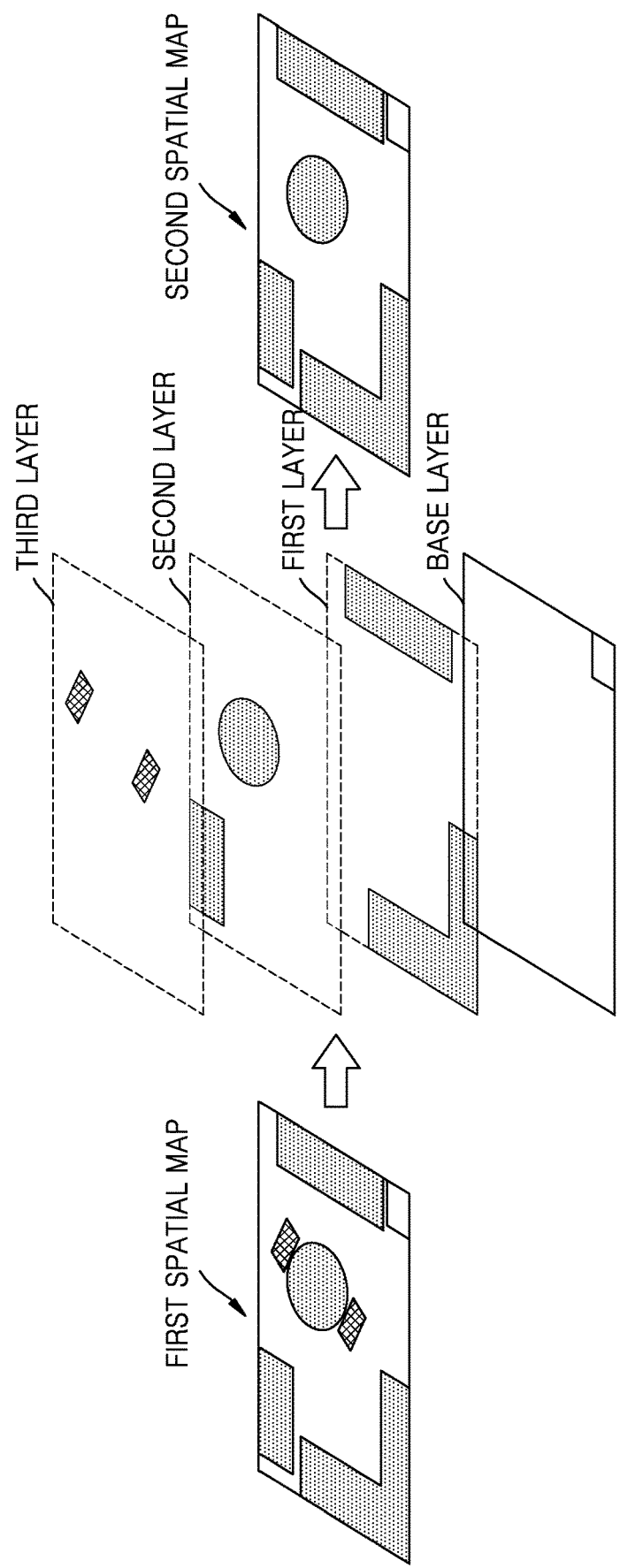

Referring to FIG. 3B, the electronic device 100 may load a first spatial map stored therein. In a case in which a task to be performed by the electronic device 100 does not require information about objects with ML 4 that move frequently is not needed, or requires only information about objects that have not moved for a week or longer, the electronic device 100 may obtain a second spatial map by selecting the base layer, the first layer, and the second layer from among the layers constituting the first spatial map, or removing the third layer from the first spatial map.

Figure 3C:
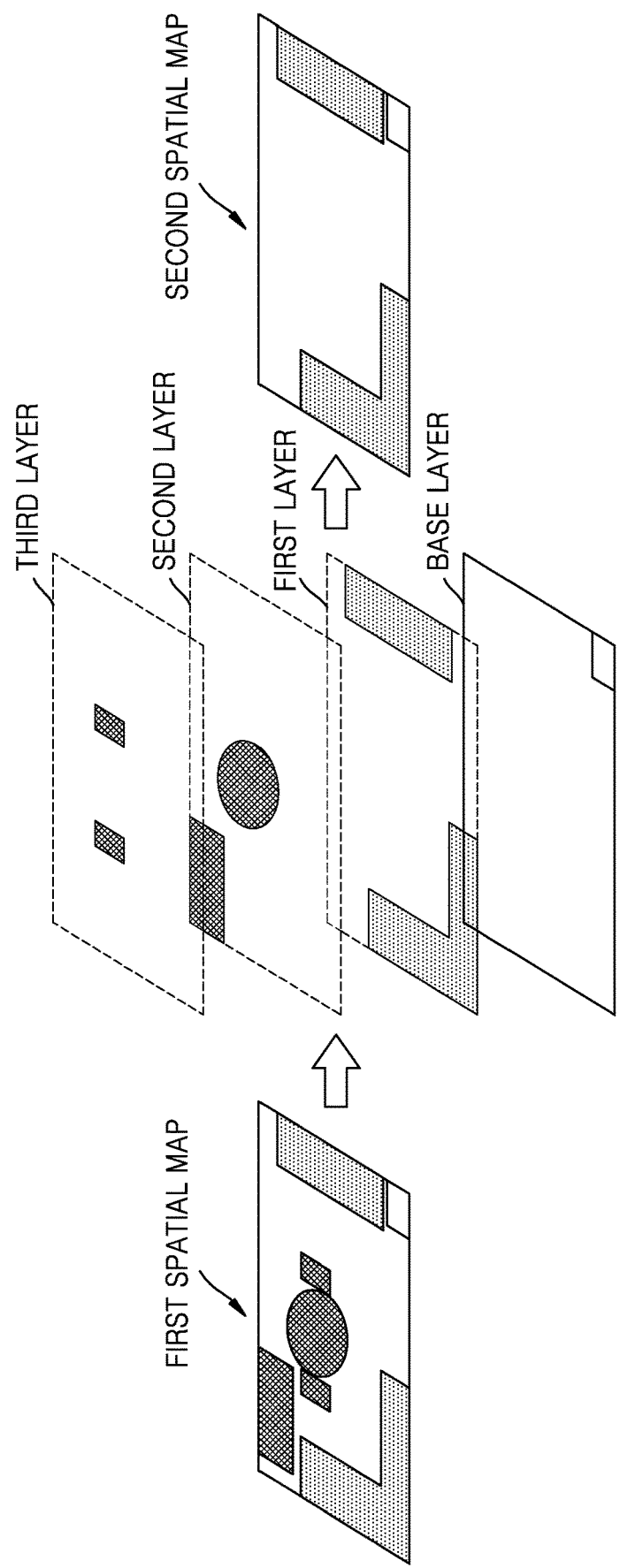

Referring to FIG. 3C, the electronic device 100 may load a first spatial map stored therein. In a case in which a new task to be performed by the electronic device 100 requires information about objects with ML 1 or only information about objects that have not moved for more than a month or longer, the electronic device 100 may obtain a second spatial map by selecting the base layer and the first layer from among the layers constituting the first spatial map, or removing the second layer and the third layer from the first spatial map.

Figure 3D:
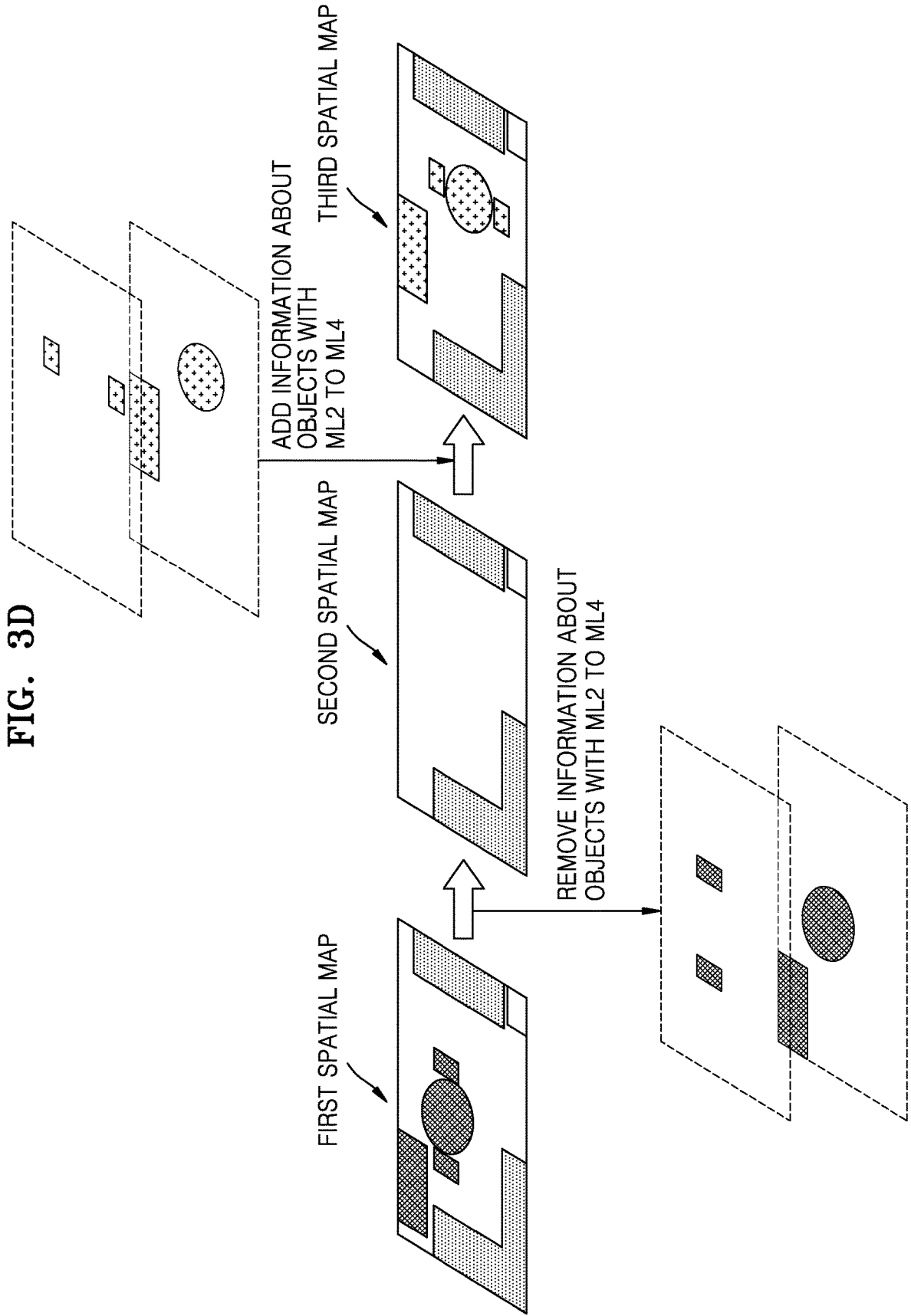

Referring to FIG. 3D, the electronic device 100 may load a first spatial map stored therein. In a case in which a new task to be performed by the electronic device 100 requires reflection of up-to-date information about objects with ML 2, ML 3, and ML 4 that are movable, the electronic device 100 may obtain a second spatial map by selecting the base layer and the first layer from among the layers constituting the first spatial map, or removing the second layer and the third layer from the first spatial map. Thereafter, the electronic device 100 may obtain a third spatial map by extracting the second layer and the third layer from a spatial map received from an external device and applying them to the second spatial map. Alternatively, the electronic device 100 may obtain a third spatial map by detecting objects corresponding to ML 2, ML 3, and ML 4 by using at least one sensor provided in the electronic device 100, and reflecting them in the second spatial map.

Figure 4:
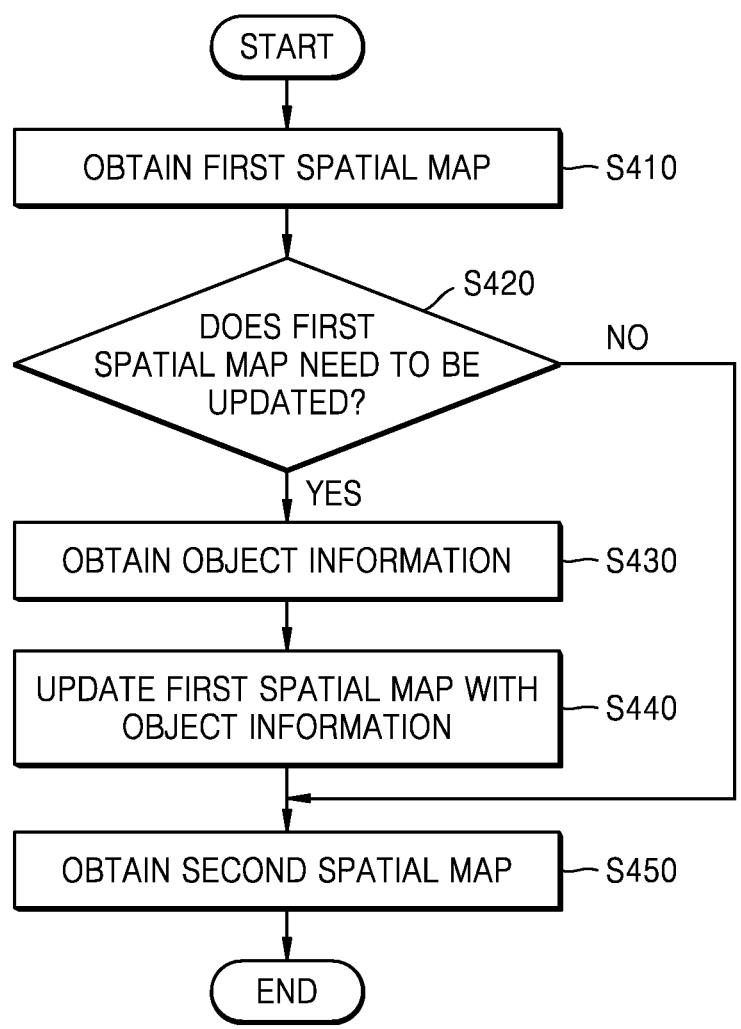
FIG. 4 illustrates a method of obtaining a spatial map, according to an embodiment of the disclosure.

FIG. 4 is a flowchart of a method of obtaining a spatial map, according to an embodiment of the disclosure.

The electronic device 100 may obtain a first spatial map (S410). The first spatial map may include a plurality of layers based on object attribute information. The first spatial map may be generated by the electronic device 100 or may be received from a device external to the electronic device 100.

The electronic device 100 may determine whether the first spatial map needs to be updated (S420). For example, the electronic device 100 may determine whether the first spatial map needs to be updated, according to the characteristics of a task. The 'task' is set by the electronic device 100 to perform through a unique purpose of the electronic device 100 or a function of the electronic device 100. Setting information related to execution of the task may be input to the electronic device 100 manually by the user or transmitted to the electronic device 100 through a terminal such as a mobile device or a dedicated remote controller. For example, in a case in which the electronic device 100 is a robot vacuum cleaner, the task of the robot vacuum cleaner may be cleaning the home or an area set by the user, scheduled cleaning through a scheduling function, low-noise mode cleaning, or the like. When information to be used to perform the task is insufficient, the electronic device 100 may determine that the first spatial map needs to be updated. When up-to-date information about objects in a space in which the task is to be performed is necessary, the electronic device 100 may determine that the first spatial map needs to be updated. In an embodiment, the electronic device 100 may determine whether the first spatial map needs to be updated, according to the elapsed time from when the first spatial map is obtained, or a set update cycle. When the first spatial map does not need to be updated, the electronic device 100 may use the first spatial map as a second spatial map that is used to perform the task.

When the first spatial map needs to be updated, the electronic device 100 may obtain object information (S430). The electronic device 100 may collect spatial scan information or object information by itself by using at least one sensor. The electronic device 100 may receive part or all of a spatial map, or spatial scan information or object information from an external device.

The electronic device 100 may update the first spatial map with the obtained spatial scan information or object information by using the spatial scan information or object information (S440). For example, for objects that frequently move, the electronic device 100 may newly obtain information about the objects, or spatial scan information about positions where the objects were located, to update the first spatial map to reflect up-to-date position information.

The electronic device 100 may obtain a second spatial map (S450). The electronic device 100 may obtain the second space map by using the first space map as it is, by using the first space map in which some object information or some layers are modified, or by updating the first space map.

In an embodiment, the second spatial map to be used to perform the task may be converted into or generated in an appropriate type of map according to the function of the electronic device 100 or the characteristics of the task, and then used. For example, in a case in which the electronic device 100 is a robot vacuum cleaner, the electronic device 100 may generate a navigation map based on a spatial map, and perform cleaning along a movement path provided by the navigation map.

In an embodiment of the disclosure, the spatial map may be generated by combining spatial scan information or object information collected from different devices. The spatial map may further include information in the form of metadata indicating a device or position and/or a viewpoint from which each piece of collected information has been obtained. For example, in a case in which different devices scan a certain space and detect objects from different positions and/or viewpoints, a spatial map may be generated by using images obtained by the respective devices or object recognition results obtained from the images. The spatial map may be tagged or labeled with information indicating the object recognition result and the position and/or viewpoint from which the object recognition result is obtained, for each object in the space.

Figure 5:
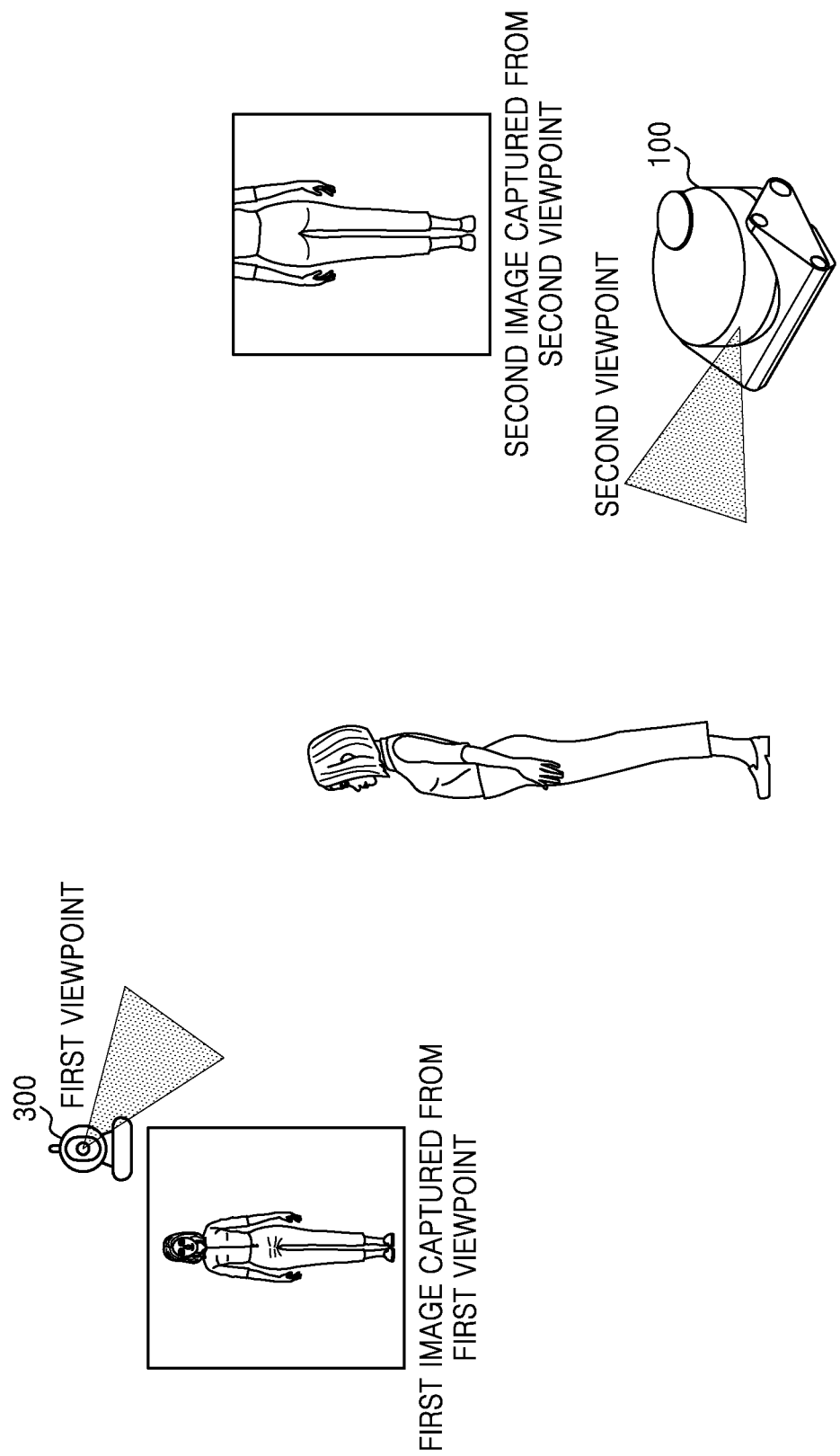
FIG. 5 illustrates object recognition results for images captured from different viewpoints, according to an embodiment of the disclosure.

FIG. 5 is a diagram for describing object recognition results for images captured from different viewpoints.

Devices located in a space including at least one object may photograph (or capture) the object from different viewpoints depending on the position or operation method of each device and a camera provided in each device. As illustrated in FIG. 5, a first camera provided in an external device 300 may photograph an object in the space to obtain a first image captured from a first viewpoint. A second camera provided in the electronic device 100 may photograph the object in the space to obtain a second image captured from a second viewpoint.

The first camera provided in the external device 300, such as a smart home camera, is able to photograph an object in a bird's eye view, an eye-level view, or a high-angle view, but is stationary and thus unable to photograph the entire space. A general large-scale data set for training a neural network model for performing a vision task includes mainly images captured in a bird's eye view, an eye-level view, or a high-angle view, and may enable the neural network model to better recognize an object in an image than when trained based on a data set including images captured in a low-angle view.

On the contrary, the electronic device 100, such as a robot vacuum cleaner, is movable, and thus, the second camera provided in the electronic device 100 is advantageous for capturing various areas in the space, but is mounted at a low height, and thus, photographs objects in a low-angle view. Images captured in a low-angle view have a limited field of view, and thus may contain only part of an object or may contain an object in a form that makes vision recognition difficult. As it may be difficult to obtain a training data set of images captured in a low-angle view, it is difficult to train a neural network model for performing a vision task by using an image captured in a low-angle view as an input, which inevitably reduces the accuracy and stability of object recognition. There may be practical difficulties in obtaining a training data set to complement this issue, as it costs a lot. It is difficult for the electronic device 100, such as a robot vacuum cleaner, to receive a high-resolution image for real-time computation. Also, cost issues arise when a high-performance camera is installed therein.

A neural network model equipped in the external device 300, such as a smart home camera, has relatively stable and accurate vision task performance compared to the neural network model equipped in the electronic device 100, such as a robot vacuum cleaner. Hereinafter, a method, performed by the electronic device 100, of training a neural network model that uses, as an input, an image captured in a view for which training data sets are limited, for example, a low-angle view, by using an object recognition result predicted by the neural network model equipped in the external device 300 will be described. In some embodiments, the method is used to train a neural network model by augmenting images representing objects captured by multiple cameras. One advantage of the method is to improve the accuracy of the images capturing the objects, for example, in a background or a space (e.g., a room). As data accumulates and the neural network model is learned with the accumulated data, the performance of an electronic device (e.g., a robot), such as detection, tracking, and pose recognition, improves. The methods of the disclosure can be used in a variety of applications, such as tracking members, recognizing gestures/actions (e.g., pointing gesture, cleaning a specific location), and detecting abnormal situations.

Figure 6:
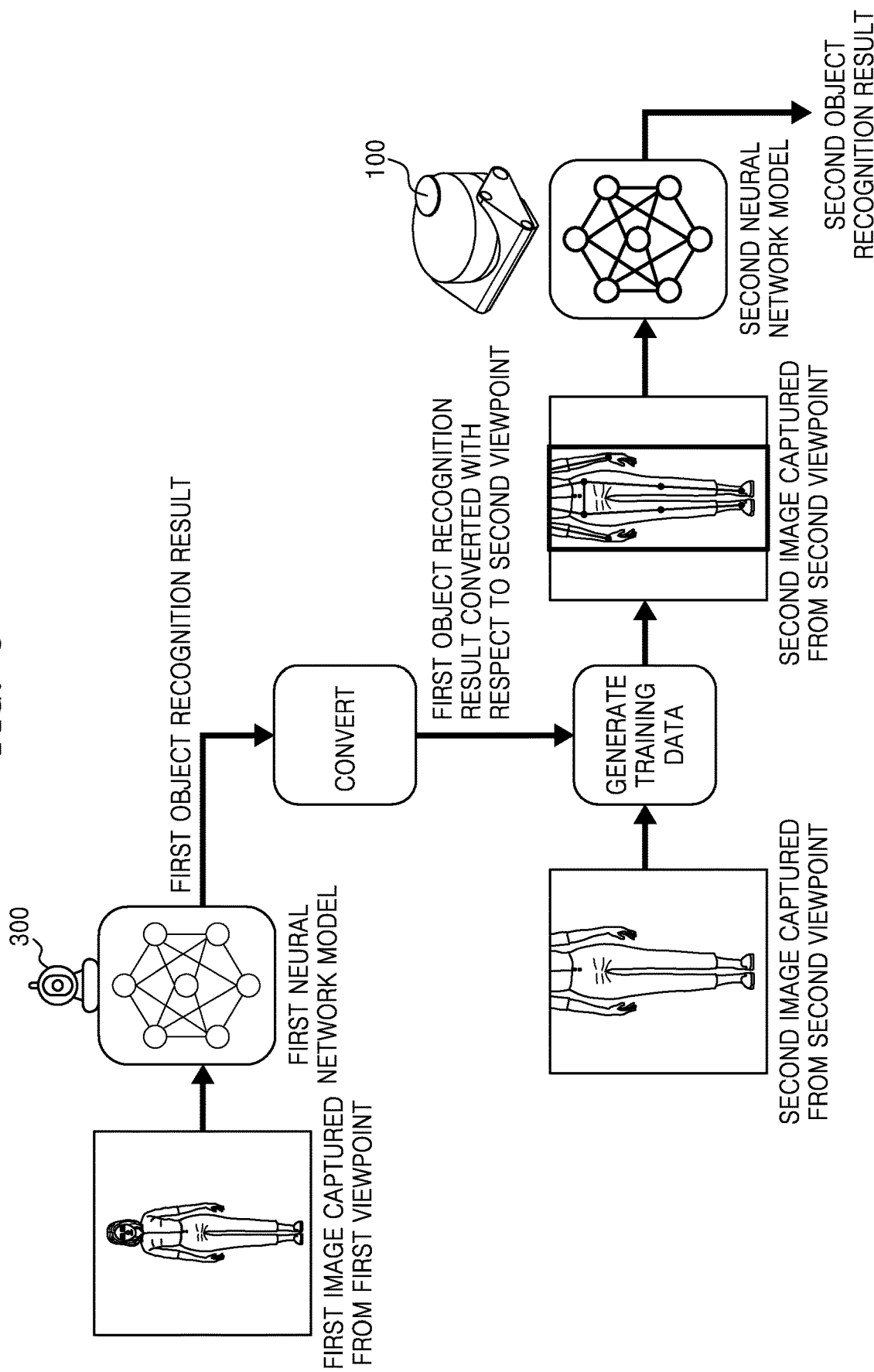
FIG. 6 illustrates a process of generating training data by using a first object recognition result predicted by a first neural network model using a first image as an input, in order to train a second neural network model, according to an embodiment of the disclosure.

FIG. 6 is a diagram for describing a process of generating training data by using a first object recognition result predicted by a first neural network model that uses a first image as an input, to train a second neural network model. FIG. 6 illustrates, that the electronic device 100 trains the second neural network model, but the disclosure is not limited thereto, and the cloud server 200 that manages the second neural network model may train the second neural network model. Hereinafter, in descriptions will be provided with reference to FIGS. 6 to 12, as an example embodiment, the electronic device 100 trains the second neural network model.

Referring to FIG. 6, the external device 300 includes a first camera configured to photograph a space including at least one object from a first viewpoint. The first neural network model equipped in the external device 300 may receive a first image captured by the first camera as an input and output a first object recognition result. The first image captured from the first viewpoint may be an image captured in a bird's eye view, an eye-level view, or a high-angle view. The electronic device 100 includes a second camera configured to photograph a space including at least one object from a second viewpoint. A second neural network model equipped in the electronic device 100 may receive a second image captured by the second camera as an input and output a second object recognition result. The second image captured from the second viewpoint may be an image captured in a low-angle view.

Figure 7:
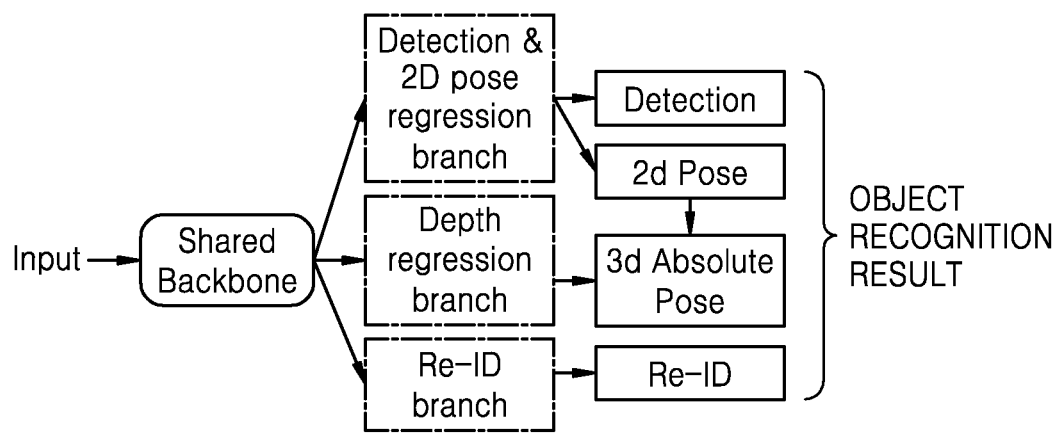
FIG. 7 illustrates an example of a first neural network model or a second neural network model, according to an embodiment of the disclosure.

FIG. 7 is a diagram for describing an example of a first neural network model or a second neural network model.

According to an embodiment of the disclosure, the first neural network model or the second neural network model may be a multi-task model for performing vision tasks as illustrated in FIG. 7. The multi-task model may be a neural network including a plurality of layers. The multi-task model may include shared backbone layers and additional layers for the respective tasks, which receive outputs of the shared backbone layers as inputs, respectively. The multi-task model may include a feature extractor for extracting features necessary for prediction, and a plurality of predictors for performing prediction by using the features extracted by the feature extractor. For example, for a vision model for performing tasks in the vision field, a multi-task model in which a prediction head for each task is connected to a feature extractor may be used. However, the type of the multi-task model according to an embodiment of the disclosure is not limited to the model illustrated in FIG. 7.

The first neural network model equipped in the external device 300 and the second neural network model equipped in the electronic device 100 may be multi-task models as illustrated in FIG. 7, but are not limited thereto.

Referring to the multi-task model illustrated in FIG. 7, features extracted by the shared backbone may be input into the additional layers for the respective tasks to obtain output values for the respective tasks. The prediction heads for the respective tasks include a detection and two-dimensional pose regression branch, a depth regression branch, and a re-identification (Re-ID) branch. Accordingly, output values of the prediction heads for the respective tasks may include object detection information, two-dimensional pose information, three-dimensional pose information, re-identification feature information, and the like. In this case, object tracking may be performed on consecutive images through object detection information and re-identification feature information, and identification information of an object may be obtained by checking whether the identity of the object is maintained. As a result, the multi-task model illustrated in FIG. 7 may receive an image as an input and output an object recognition result for the image.

The object recognition result predicted by the multi-task model illustrated in FIG. 7 may include detection information of an object, two-dimensional pose information including image coordinates of feature points representing the position of the object in the image, three-dimensional pose information including spatial coordinates of feature points representing the position and direction of the object, and identification information of the object.

Referring back to FIG. 6, the first image captured from the first viewpoint includes the entire object in the space. On the contrary, the second image captured from the second viewpoint includes only part of the back of the same object in the same space. When a neural network model for performing a vision task performs the vision task on an image including only part of an object (for example, the second image), the neural network model may make errors such as failures in detecting, recognizing, or locating objects. In a case in which the neural network model for performing the vision task is based on self-supervised learning, it may be difficult to obtain a training data set due to object recognition errors, resulting in a vicious cycle in which the accuracy of the neural network model is not improved.

According to an embodiment of the disclosure, in a case in which the external device 300 and the electronic device 100 photograph the same object in the same space to obtain a first image from a first viewpoint and a second image from a second viewpoint, respectively, a first object recognition result output by the first neural network model equipped in the external device 300 for the first image may be converted by using a relationship between the first and second viewpoints, and the first object recognition result converted with respect to the second viewpoint may be used as a label for the second image captured by the electronic device 100. The label is information related to original data and refers to metadata that provides additional information about the original data. Labeling is inputting or adding the label to the original data, and depending on the labeling method, annotation such as bounding box, polygon segmentation, point, or key point may be performed. For example, the electronic device 100 may obtain a label for the second image by converting the first object recognition result predicted by the first neural network model using the first image as an input, based on a conversion relationship between a first camera coordinate system of the external device 300 and a second camera coordinate system of the electronic device 100.

Figure 8:
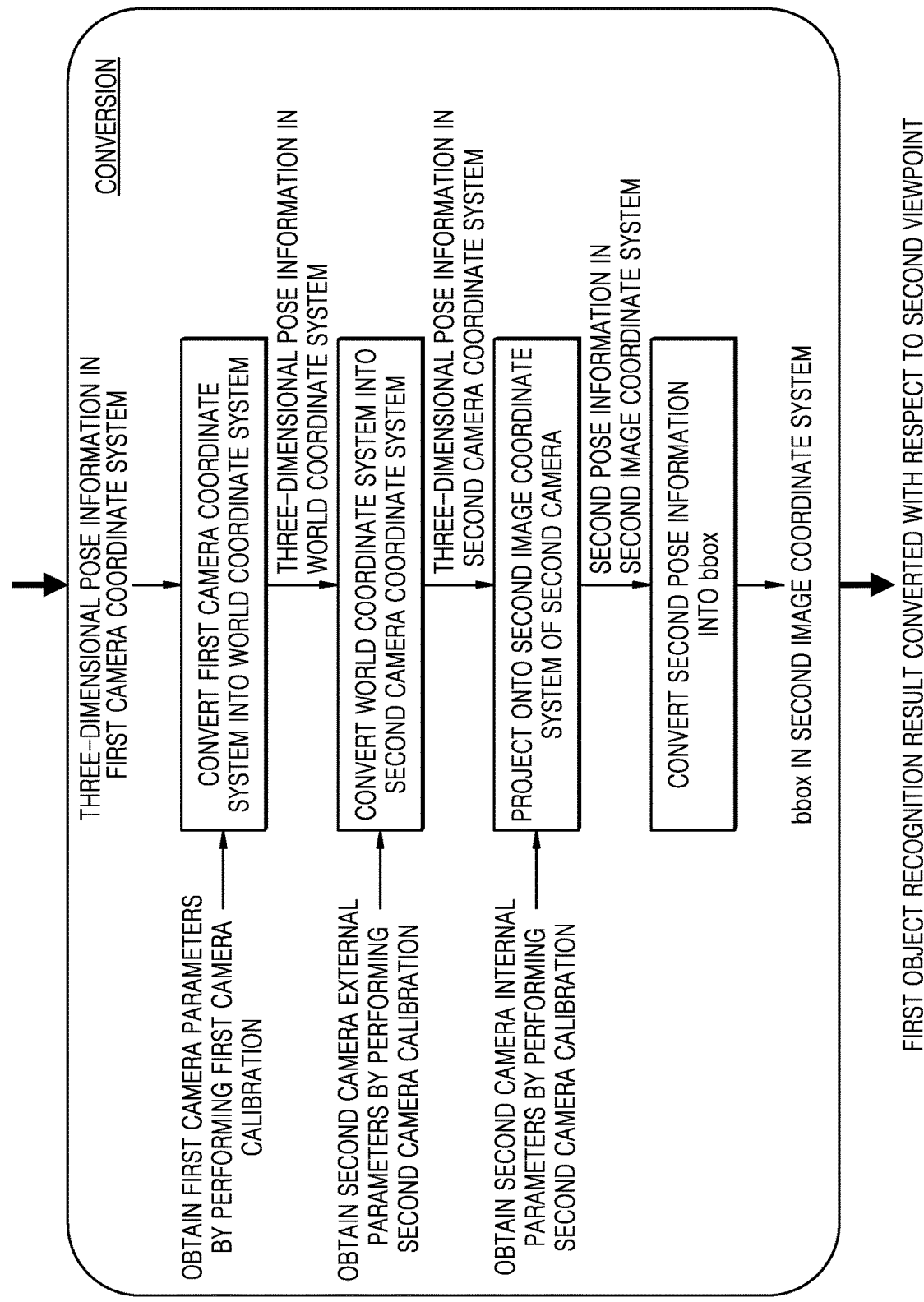
FIG. 8 illustrates a process of converting a first object recognition result predicted from a first image, in order to obtain the first object recognition result converted with respect to a second viewpoint, according to an embodiment of the disclosure.

FIG. 8 is a diagram for describing a process of converting a first object recognition result predicted by a first neural network model using a first image as an input, to obtain the first object recognition result converted with respect to a second viewpoint. The conversion process of FIG. 8 may be performed by the electronic device 100 or the cloud server 200.

The first object recognition result may include detection information of an object, two-dimensional pose information in a first image coordinate system including image coordinates of feature points representing the position of the object in the first image, three-dimensional pose information in a first camera coordinate system including spatial coordinates of feature points representing the position and direction of the object, and identification information of the object.

FIG. 8 illustrates a process of converting the three-dimensional pose information in a first camera coordinate system included in the first object recognition result into two-dimensional pose information in a second image coordinate system, and converting the two-dimensional pose information into a bounding box (bbox).

First, based on a conversion relationship between the first camera coordinate system and a world coordinate system, the three-dimensional pose information in the first camera coordinate system is converted into three-dimensional pose information in the world coordinate system. The conversion relationship between the first camera coordinate system and the world coordinate system may be identified by performing first camera calibration to obtain internal parameters and external parameters of the first camera. The internal parameters may be identified through the specifications of the camera, such as the focal length, principal point, and skew coefficient of the camera. The external parameters relate to a geometric relationship between the camera and an external space, such as the installation height and direction (e.g., the pan or tilt) of the camera, and may vary depending on where and in what direction the camera is installed and how the world coordinate system is defined. The external parameters of the first camera may be identified by identifying the internal parameters of the first camera and then using matching pairs of spatial coordinates in a previously known world coordinate system, and image coordinates in the image coordinate system of the first camera corresponding to the spatial coordinates, respectively.

For example, the external parameters of the first camera mounted on the external device 300 (such as a smart home camera) may be identified by using the internal parameters of the first camera and matching pairs of spatial coordinates of at least four feature points in the world coordinate system, and image coordinates in the image coordinate system of the first camera corresponding to the feature points, respectively. In this case, the matching pairs may be obtained by detecting a plurality of feature points within the field of view of the first camera of the external device 300 by using the movable electronic device 100. For example, in a case in which the electronic device 100 is a robot vacuum cleaner, the center point of a certain detection area may be used as a feature point, or a marker attached to the robot vacuum cleaner or an external feature of the robot vacuum cleaner may be used as a feature point. The spatial coordinates of the feature points in the world coordinate system may be obtained through the height of the robot vacuum cleaner and the position of a feature point within the robot vacuum cleaner and simultaneous localization and mapping (SLAM), and the image coordinates of the feature points in the image coordinate system of the first camera may be obtained through two-dimensional coordinates of the feature points detected in a smart home camera image.

Based on a conversion relationship between the world coordinate system and the second camera coordinate system, the three-dimensional pose information in the world coordinate system is converted into three-dimensional pose information in the second camera coordinate system. The conversion relationship between the world coordinate system and the second camera coordinate system may be identified by performing second camera calibration to obtain external parameters of the second camera, and may be represented by a rotation matrix and a translation matrix for converting the world coordinate system into the second camera coordinate system.

By projecting spatial coordinates in the second camera coordinate system to the second image coordinate system of the second camera, the three-dimensional pose information in the second camera coordinate system is converted into two-dimensional pose information in the second image coordinate system. A projection matrix may be identified by performing second camera calibration to obtain internal parameters of the second camera.

Bounding box (bbox) information for estimating an object area may be generated from the two-dimensional pose information in the second image coordinate system by allowing a preset margin value for each minimum and maximum value of x and y of the two-dimensional pose information in the second image coordinate system.

Accordingly, the first object recognition result converted with respect to the second viewpoint and includes detection information and identification information of the object, two-dimensional pose information in the second image coordinate system, three-dimensional pose information in the second camera coordinate system, and bounding box information in which the existence of the object in the second image is identifiable may be obtained. Referring back to FIG. 6, the electronic device 100 may generate training data by performing labeling on the second image corresponding to the first image, based on the first object recognition result converted with respect to the second viewpoint. That the first image and the second image correspond to each other means that the relationship therebetween is most appropriate for generating training data for the second image by using the object recognition result predicted by the neural network model using the first image as an input. The electronic device 100 may identify a pair of timestamps corresponding to each other by comparing a timestamp corresponding to the first object recognition result with a timestamp of the second image. The timestamp corresponding to the first object recognition result may be a timestamp of the first image. When it is determined that the object is present in the second image corresponding to the first image, labeling may be performed on the second image based on the first object recognition result converted with respect to the second viewpoint.

For example, in a case in which the electronic device 100 for performing a task by recognizing pose information of an object is a robot vacuum cleaner, a neural network model equipped in the robot vacuum cleaner needs to be trained to better recognize pose information of an object, but there are limitations to training data sets for training the neural network model equipped in the robot vacuum cleaner. To this end, the electronic device 100 may generate an image captured in a low-angle view as training data by using the object recognition result predicted by the first neural network model equipped in the external device 300.

As described above with reference to FIG. 8, the electronic device 100 may obtain the first object recognition result converted with respect to the second viewpoint by converting the first object recognition result predicted by the first neural network model using the first image as an input. For example, the electronic device 100 may convert three-dimensional pose information including spatial coordinates of feature points representing the position and direction of the object identified in the first image into two-dimensional pose information including image coordinates of feature points representing the position of the object identified in the second image, based on the conversion relationship between the first camera coordinate system corresponding to the first camera configured to capture an image from the first viewpoint, and the second camera coordinate system corresponding to the second camera configured to capture an image from the second viewpoint. The electronic device 100 may generate training data by performing labeling on the second image such that the two-dimensional pose information included in the first object recognition result converted with respect to the second viewpoint is used as two-dimensional pose information of the object in the second image.

The electronic device 100 may generate training data by performing labeling on the second image such that, among the two-dimensional pose information included in the first object recognition result converted with respect to the second viewpoint, a first part corresponding to the second image is distinguished from a second part that does not correspond to the second image. In a case in which part of the two-dimensional pose information included in the first object recognition result converted with respect to the second viewpoint is not visible in the second image, the second image may be labeled with the part invisible in the second image as well as the visible part. For example, in a case in which the two-dimensional pose information is skeleton information about the entire body of the object, and even the upper body of the object is not visible in the second image, the electronic device 100 may perform labeling on the second image based on the two-dimensional pose information, which is the skeleton information about the entire body of the object. In this case, the electronic device 100 may generate training data by performing labeling such that, for (x, y, visibility) representing position and visibility values for each joint point constituting the skeleton information, the visibility value for each joint point corresponding to the lower body visible in the second image is set to '1', and the visibility value for each joint point corresponding to the upper body invisible in the second image is set to '0'.

According to an embodiment of the disclosure, the electronic device 100 may generate a plurality of second images as training data. Hereinafter, descriptions will be provided with reference to FIGS. 9 to 11.

Figure 9:
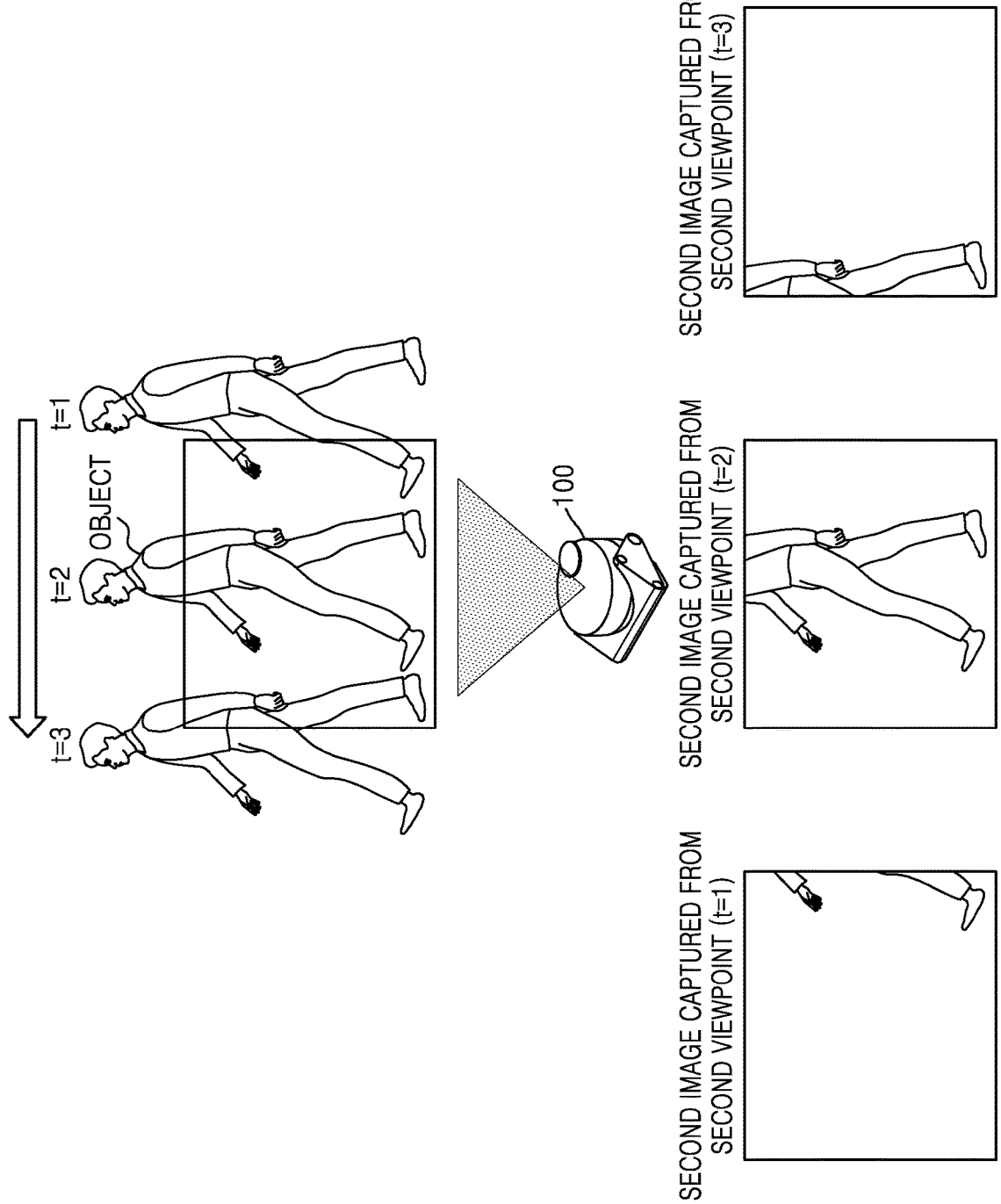
FIG. 9 illustrates an example of generating training data for each of a plurality of second images captured from a second viewpoint, according to an embodiment of the disclosure.

FIG. 9 is a diagram for describing an example of generating training data for each of a plurality of second images captured from a second viewpoint.

FIG. 9 illustrates that the second camera of the electronic device 100 obtains a plurality of second images captured from the second viewpoint by capturing a dynamic object at preset time intervals while maintaining the second viewpoint. In a case in which a plurality of second images are captured by the second camera from the second viewpoint as described above, the electronic device 100 may generate training data by performing labeling on each of the plurality of second images based on the first object recognition result converted with respect to the second viewpoint.

As illustrated in FIG. 9, when the second camera captures images for a certain time period while maintaining the second viewpoint, when t=1, an image in which the object is appearing at the right end of the field of view of the electronic device 100 may be captured, when t=2, an image in which the object is in the center of the field of view of the electronic device 100 may be captured, and when t=3, an image in which the object is disappearing from the left end of the field of the electronic device 100 may be captured. The second camera of the electronic device 100 captures the second images in a low-angle view mainly focusing on the lower body of the object rather than the entire body, and it may be difficult to detect and recognize pose information of the object. In this case, by using the first object recognition result predicted by the first neural network model using, as an input, the first image obtained by the first camera of the external device 300 capturing the object, labeling based on the first object recognition result converted with respect to the second viewpoint may be performed on each of the plurality of second images. Referring to FIG. 9, for t=1 and t=3, only part of two-dimensional pose information included in the first object recognition result converted with respect to the second viewpoint may be used as a label for pose information of the object in the second image captured from the second viewpoint. For t=2, joint point information corresponding to parts of the lower body and the upper body among the two-dimensional pose information included in the first object recognition result converted with respect to the second viewpoint may be used as a label for pose information of the object in the second image captured from the second viewpoint.

Figure 10:
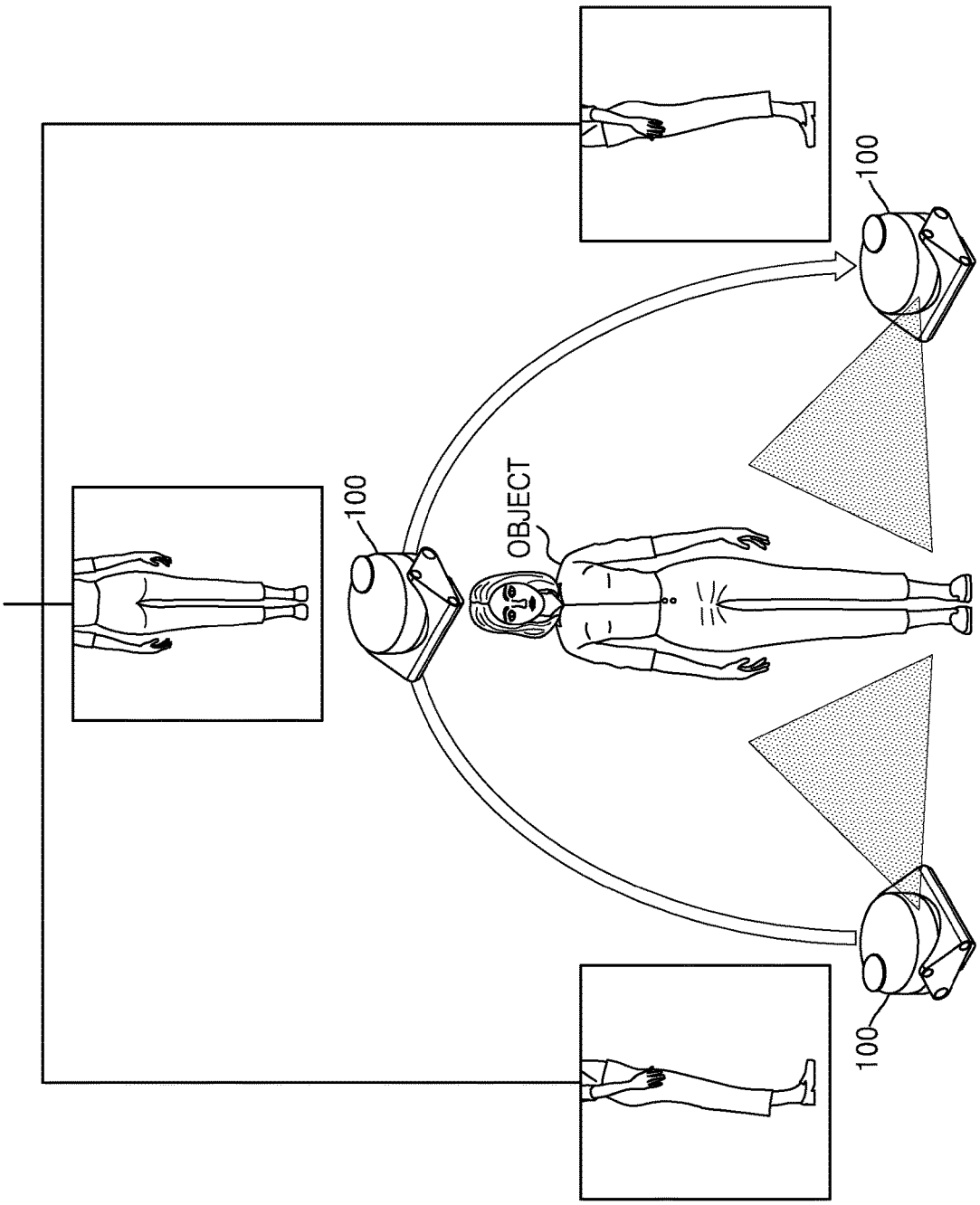
FIGS. 10 and 11 illustrate an example of generating training data for each of a plurality of second images captured from a plurality of different second viewpoints, respectively, according to an embodiment of the disclosure.
Figure 11:
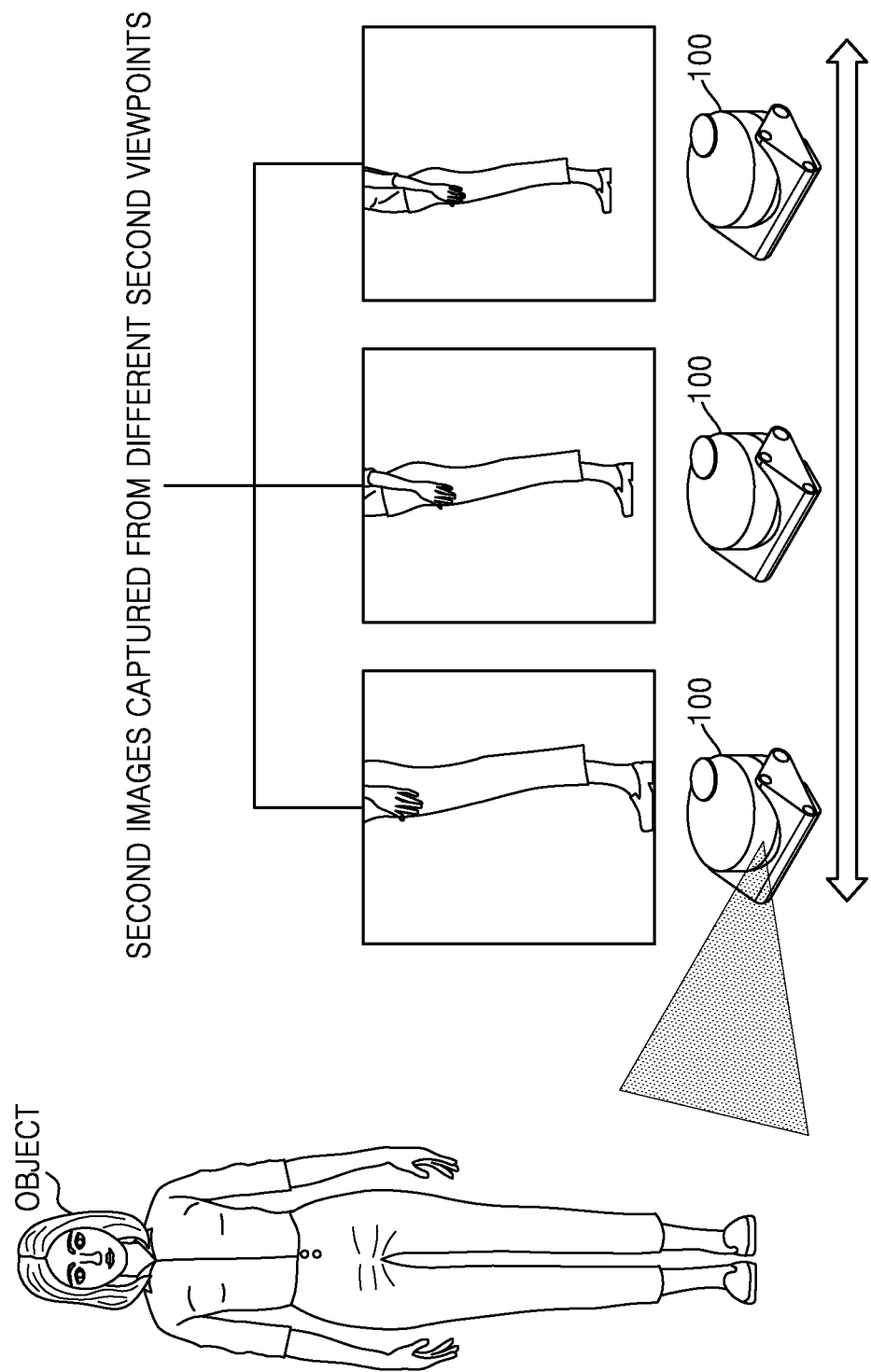

FIGS. 10 and 11 are diagrams for describing an example of generating training data for each of a plurality of second images captured from a plurality of different second viewpoints, respectively.

FIGS. 10 and 11 each illustrate that the second camera of the electronic device 100 obtains a plurality of second images by capturing an object from a plurality of different second viewpoints. FIG. 10 illustrates a plurality of second images respectively captured from a plurality of different second viewpoints by the second camera mounted on the electronic device 100 while rotating around a static object. As illustrated in FIG. 10, the second camera of the electronic device 100 captures second images mainly of the lower body of the object rather than the entire body by capturing the rear, left, and right sides of the object in a low-angle view, and it may be difficult to detect and recognize pose information of the object. FIG. 11 illustrates a plurality of second images respectively captured from a plurality of different second viewpoints by the second camera of the electronic device 100 while changing the distance to a static object. As illustrated in FIG. 11, the second camera of the electronic device 100 second images mainly of the lower body of the object rather than the entire body by capturing the object in a low-angle view while getting closer to or away from the object such that the object appears large or small in the images, and it may be difficult to detect and recognize pose information of the object.

As such, when a plurality of second images are captured by the second camera respectively from a plurality of different second viewpoints, the electronic device 100 may convert a first object recognition result predicted by the first neural network model of the external device 300, based on a conversion relationship between the first camera coordinate system and the second camera coordinate system for each of the plurality of second viewpoints. This is because the first object recognition result converted based on each of the plurality of different second viewpoints is required for labeling. The electronic device 100 may generate training data by performing labeling on the plurality of second images based on the first object recognition result converted with respect to the plurality of second viewpoints, respectively.

In an embodiment, the electronic device 100 may generate training data at any time or according to a user's setting. In addition, when the electronic device 100 equipped with the second camera recognizes an object at a lower level than a preset standard, or when the electronic device 100 moves to a position specified in a spatial map used by the electronic device 100, the electronic device 100 may generate training data. For example, when the electronic device 100 is at the position specified in the spatial map, the field of view of the first camera of the external device 300 and the field of view of the second camera of the electronic device 100 may overlap each other. In addition, the position specified in the spatial map may be an area where an object frequently moves or a position arbitrarily marked by the user.

Referring back to FIG. 6, the electronic device 100 may train the second neural network model by using the generated training data.

Figure 12:
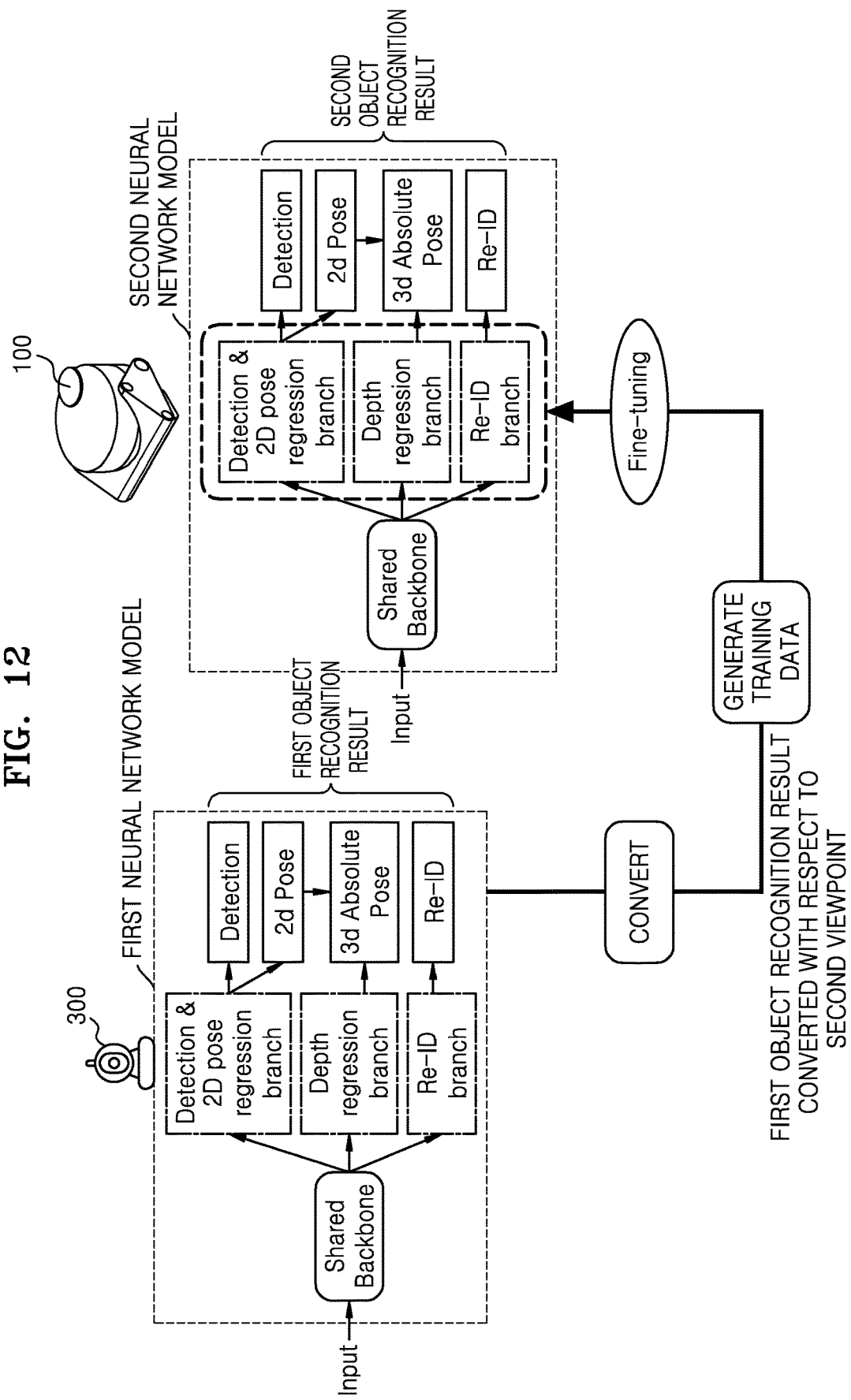
FIG. 12 illustrates a process of training a second neural network model by using training data generated by using an output of a first neural network model, according to an embodiment of the disclosure.

FIG. 12 is a diagram for describing a process of training a second neural network model by using training data generated by using an output of a first neural network model.

As described above, the first object recognition result predicted by the first neural network model of the external device 300 is obtained from the first image captured from the first viewpoint, and thus, the first object recognition result may be converted with respect to the second viewpoint, and the first object recognition result converted with respect to the second viewpoint may be used to perform labeling to generate training data for the second neural network model of the electronic device 100.

The electronic device 100 may train the second neural network model by using the generated training data. In this case, the electronic device 100 may fine-tune the prediction head for each task of the second neural network model. Fine tuning refers to updating an existing trained neural network model by modifying the architecture thereof to fit the purpose. The second neural network model that is trained in this manner may predict a second object recognition result with improved accuracy and stability of object recognition.

Figure 13:
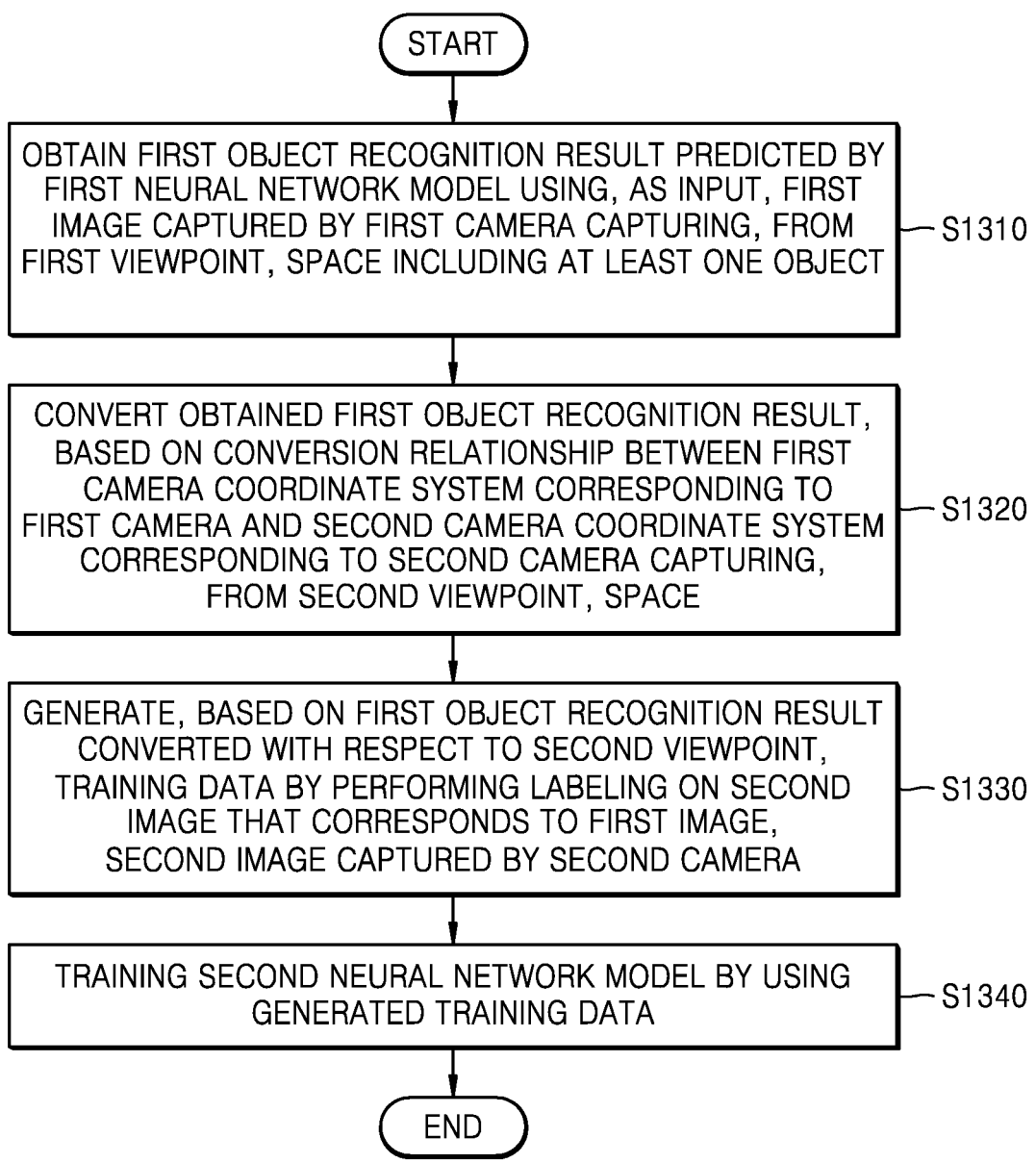
FIG. 13 illustrates a flowchart for describing a method of training a neural network model, according to an embodiment of the disclosure.

FIG. 13 is a flowchart for describing a method of training a neural network model.

The electronic device 100 or the cloud server 200 may obtain a first object recognition result predicted by a first neural network model using, as an input, a first image captured by a first camera capturing, from a first viewpoint, a space including at least one object (S1310).

According to an embodiment of the disclosure, the first camera provided in the external device 300 may photograph a space including at least one object from the first viewpoint. The first neural network model equipped in the external device 300 may predict and output the first object recognition result by using the first image captured from the first viewpoint as an input. The electronic device 100 or the cloud server 200 may receive the first object recognition result from the external device 300.

According to an embodiment of the disclosure, the first camera provided in the external device 300 may photograph a space including at least one object from the first viewpoint. The external device 300 may transmit the first image captured from the first viewpoint by the first camera to the cloud server 200 that manages a first neural network model. The cloud server 200 may receive, from the external device 300, the first image captured from the first viewpoint. The first neural network model managed by the cloud server 200 may predict and output the first object recognition result by using the first image captured from the first viewpoint as an input. The cloud server 200 may obtain a first object recognition result predicted by the first neural network model.

The electronic device 100 or the cloud server 200 may convert the obtained first object recognition result, based on a conversion relationship between a first camera coordinate system corresponding to the first camera and a second camera coordinate system corresponding to a second camera capturing, from a second viewpoint, the space (S1320). Accordingly, the first recognition result based on the first viewpoint may be converted with respect to the second viewpoint. The electronic device 100 or the cloud server 200 may use the first object recognition result converted with respect to the second viewpoint, as a label for a second image.

The first object recognition result may include detection information of an object, two-dimensional pose information in a first image coordinate system including image coordinates of feature points representing the position of the object in the first image, three-dimensional pose information in a first camera coordinate system including spatial coordinates of feature points representing the position and direction of the object, and identification information of the object.

The electronic device 100 or the cloud server 200 converts the three-dimensional pose information in the first camera coordinate system into three-dimensional pose information in a world coordinate system, based on the conversion relationship between the first camera coordinate system and the world coordinate system. The conversion relationship between the first camera coordinate system and the world coordinate system may be obtained by performing first camera calibration to obtain internal parameters of the first camera and external parameters of the first camera using matching pairs of spatial coordinates of a certain number of feature points in the world coordinate system and image coordinates of the feature points in the image coordinate system of the first camera. Here, the feature points may be detected by moving the electronic device 100 within the field of view of the first camera and detecting the center point of a certain detection area, a marker attached to the electronic device 100, or a feature of the appearance of the electronic device 100.

The electronic device 100 or the cloud server 200 converts the three-dimensional pose information in the world coordinate system into three-dimensional pose information in the second camera coordinate system, based on a conversion relationship between the world coordinate system and the second camera coordinate system. The electronic device 100 or the cloud server 200 converts the three-dimensional pose information in the second camera coordinate system into two-dimensional pose information in the second image coordinate system by projecting the spatial coordinates in the second camera coordinate system to the second image coordinate system of the second camera. The electronic device 100 or the cloud server 200 generates bounding box (bbox) information from the two-dimensional pose information in the second image coordinate system.

Accordingly, the first object recognition result converted with respect to the second viewpoint and includes detection information and identification information of the object, two-dimensional pose information in the second image coordinate system, three-dimensional pose information in the second camera coordinate system, and the bounding box information in which the existence of the object in the second image is identifiable may be obtained. Among the first object recognition result converted with respect to the second viewpoint, the bounding box information may be used as a label for estimating an object area in the second image. The pose information may be used as a label for recognizing a pose of the object in the second image. The identification information of the object may be used as a label for identifying whether the object is present in consecutive second images.

The electronic device 100 or the cloud server 200 may generate, based on the first object recognition result converted with respect to the second viewpoint, training data by performing labeling on a second image that corresponds to the first image, the second image being captured by the second camera (S1330). The electronic device 100 or the cloud server 200 may identify a pair of timestamps corresponding to each other by comparing a timestamp corresponding to the first object recognition result with a timestamp of the second image. The timestamp corresponding to the first object recognition result may be a timestamp of the first image. When it is determined that the object is present in the second image corresponding to the first image, the electronic device 100 or the cloud server 200 may perform labeling on the second image based on the first object recognition result converted with respect to the second viewpoint, which is obtained by converting the first object recognition result. The electronic device 100 may generate training data by performing labeling on the second image such that, among the two-dimensional pose information included in the first object recognition result converted with respect to the second viewpoint, a first part corresponding to the second image is distinguished from a second part that does not correspond to the second image.

For example, in a case in which the electronic device 100 is a robot vacuum cleaner for recognizing pose information of a user and performing cleaning, in order to train the neural network model equipped in the electronic device 100 to better recognize pose information of an object, the electronic device 100 may generate, as training data, images captured in a low-angle view by using an object recognition result predicted by the neural network model equipped in the external device 300. The electronic device 100 may convert three-dimensional pose information including spatial coordinates of feature points representing the position and direction of an object identified in the first image into two-dimensional pose information including image coordinates of feature points representing the position of the object identified in the second image, based on the conversion relationship between the first camera coordinate system corresponding to the first camera configured to capture an image from the first viewpoint, and the second camera coordinate system corresponding to the second camera configured to capture an image from the second viewpoint. The electronic device 100 may generate training data by performing labeling on the second image such that the two-dimensional pose information included in the first object recognition result converted with respect to the second viewpoint is used as two-dimensional pose information of the object in the second image.

According to an embodiment of the disclosure, in a case in which a plurality of second images are captured by the second camera from the second viewpoint, the electronic device 100 may generate training data by performing labeling on each of the plurality of second images based on the first object recognition result converted with respect to the second viewpoint.

According to an embodiment of the disclosure, when a plurality of second images are captured by the second camera respectively from a plurality of different second viewpoints, the electronic device 100 may convert a predicted first object recognition result based on a conversion relationship between the first camera coordinate system and the second camera coordinate system for each of the plurality of second viewpoints. The electronic device 100 may generate training data by performing labeling on the plurality of second images based on the first object recognition result converted with respect to the plurality of second viewpoints, respectively.

According to an embodiment of the disclosure, when the electronic device 100 equipped with the second camera recognizes an object at a lower level than a preset standard, or when the electronic device 100 moves to a position specified in a spatial map used by the electronic device 100, the electronic device 100 may generate training data. For example, when the electronic device 100 is at the position specified in the spatial map, the field of view of the first camera of the external device 300 and the field of view of the second camera of the electronic device 100 may overlap each other. In addition, the position specified in the spatial map may be an area where an object frequently moves or a position arbitrarily marked by the user.

The electronic device 100 or the cloud server 200 may train a second neural network model by using the generated training data (S1340). The electronic device 100 or the cloud server 200 may fine-tune a prediction head for each task of the second neural network model by using the generated training data.

Figure 14:
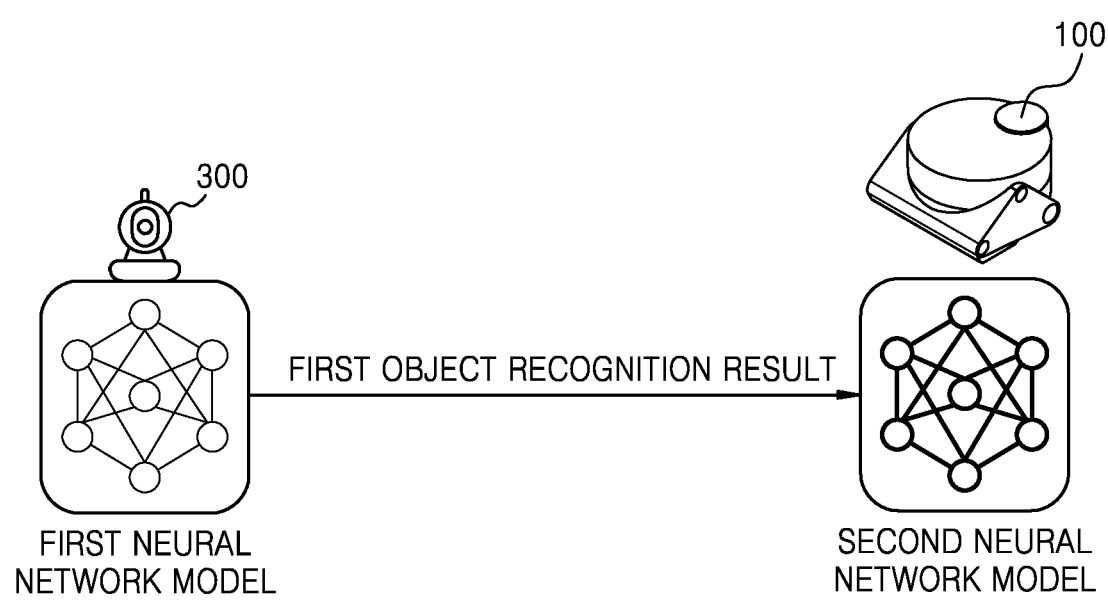
FIG. 14 illustrates an example of training a neural network model on an electronic device, according to an embodiment of the disclosure.

FIG. 14 is a diagram illustrating an example of training a neural network model on the electronic device 100.

Referring to FIG. 14, the external device 300 is equipped with a first neural network model, and the electronic device 100 is equipped with a second neural network model. The first camera provided in the external device 300 may photograph a space including at least one object from the first viewpoint. The first neural network model equipped in the external device 300 may predict and output a first object recognition result by using a first image captured from the first viewpoint as an input. The external device 300 may transmit the first object recognition result predicted by the first neural network model to the electronic device 100. The electronic device 100 may receive the first object recognition result from the external device 300.

The electronic device 100 may convert the first object recognition result received from the external device 300, based on a conversion relationship between a second camera coordinate system corresponding to the second camera capturing, from the second viewpoint, the same space and a first camera coordinate system corresponding to the first camera of the external device 300. Accordingly, the first recognition result received from the external device 300 may be converted with respect to the second viewpoint. The electronic device 100 may use the first object recognition result converted with respect to the second viewpoint, as a label for a second image.

The electronic device 100 may generate training data by performing labeling on the second image corresponding to the first image captured from the first viewpoint by the first camera of the external device 300, based on the first object recognition result converted with respect to the second viewpoint. The electronic device 100 may train the second neural network model by using the generated training data.

Figure 15:
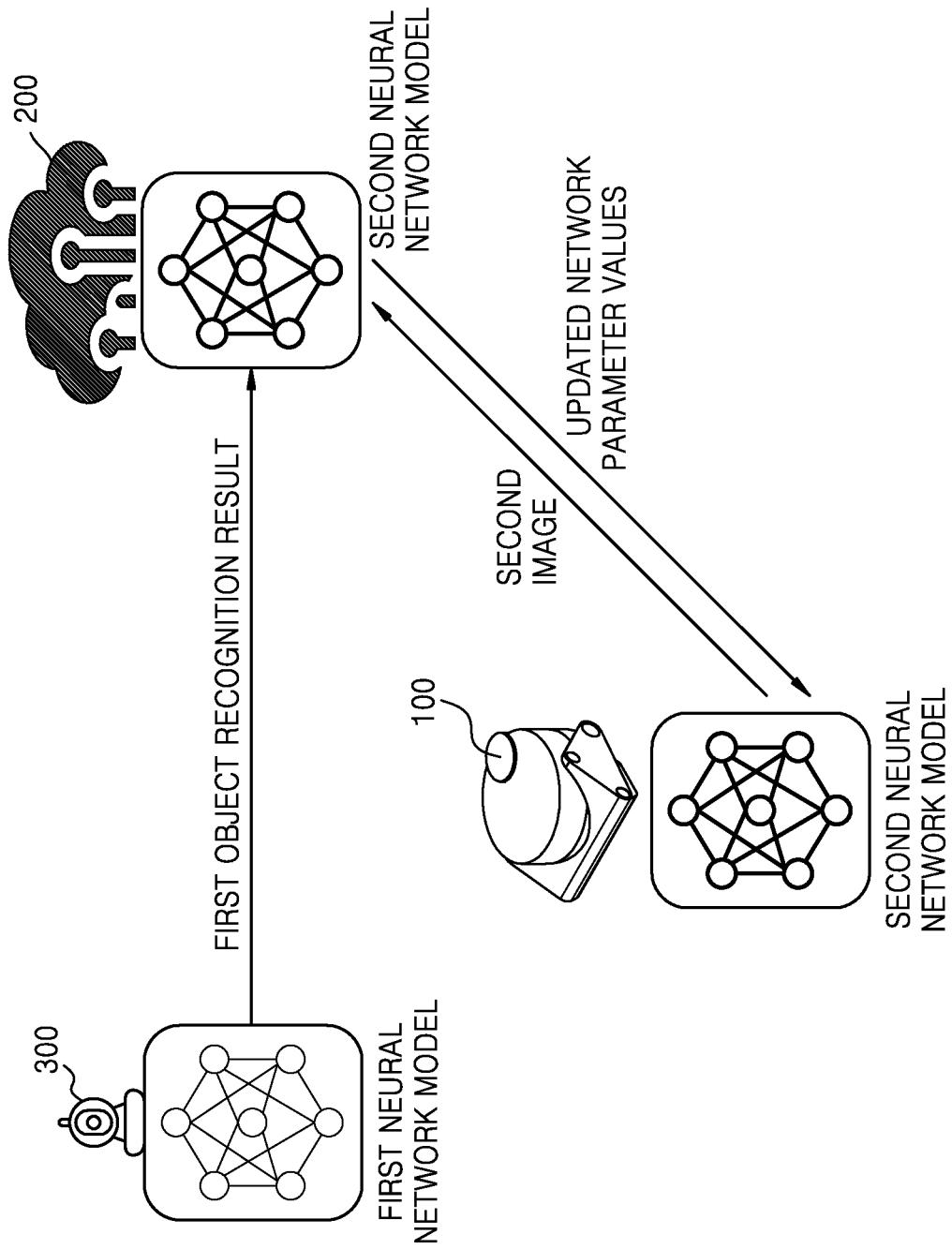
FIG. 15 illustrates an example of training a neural network model on a cloud server, according to an embodiment of the disclosure.

FIG. 15 is a diagram illustrating an example of training a neural network model on the cloud server 200.

Referring to FIG. 15, the external device 300 is equipped with a first neural network model, and the cloud server 200 and the electronic device 100 are equipped with a second neural network model. The first camera provided in the external device 300 may photograph a space including at least one object from a first viewpoint. The first neural network model equipped in the external device 300 may predict and output a first object recognition result by using a first image captured from the first viewpoint as an input. The external device 300 may transmit the first object recognition result predicted by the first neural network model to the cloud server 200. The cloud server 200 may receive the first object recognition result from the external device 300.

The second camera provided in the electronic device 100 may obtain a second image by capturing, from a second viewpoint, the same space photographed by the first camera provided in the external device 100. The electronic device 100 may transmit the second image to the cloud server 200. The cloud server 200 may receive the second image from the electronic device 100.

The cloud server 200 may convert the first object recognition result received from the external device 300, based on a conversion relationship between a first camera coordinate system corresponding to the first camera of the external device 300 and a second camera coordinate system corresponding to the second camera of the electronic device 100. To this end, the cloud server 200 may store information about internal parameters and external parameters of the first camera related to the first camera coordinate system, and information about internal parameters and external parameters of the second camera related to the second camera coordinate system. The cloud server 200 may use the first object recognition result converted with respect to the second viewpoint, as a label for the second image.

The cloud server 200 may generate training data by performing labeling on the second image corresponding to the first image captured from the first viewpoint by the first camera of the external device 300, based on the first object recognition result converted with respect to the second viewpoint. The cloud server 200 may transmit the generated training data to the electronic device 100 equipped with the second neural network model. In this case, the electronic device 100 may train the second neural network model equipped therein by using the received training data.

The cloud server 200 may train the second neural network model by using the generated training data. When the second neural network model is trained by the cloud server 200, the cloud server 200 may transmit updated network parameter values of the trained second neural network model to the electronic device 100 equipped with the second neural network model. The electronic device 100 may update the second neural network model based on the received updated network parameter values.

Figure 16:
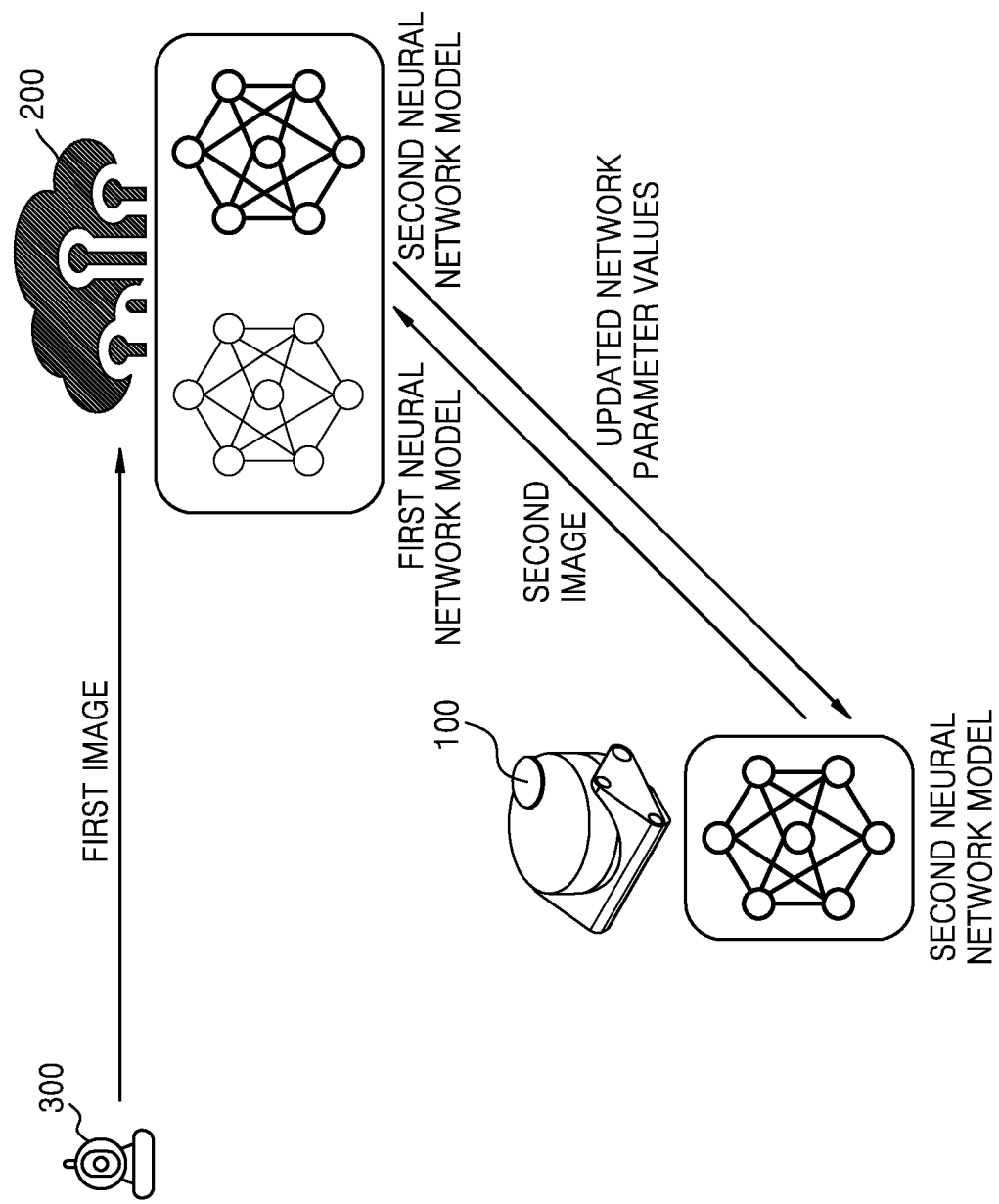
FIG. 16 illustrates an example of training a neural network model on a cloud server, according to an embodiment of the disclosure.

FIG. 16 is a diagram illustrating an example of training a neural network model on the cloud server 200.

Referring to FIG. 16, the cloud server 200 is equipped with a first neural network model and a second neural network model, and the electronic device 100 is equipped with the second neural network model. The first camera provided in the external device 300 may photograph a space including at least one object from a first viewpoint. The external device 300 may transmit, to the cloud server 200, a first image captured from the first viewpoint. The cloud server 200 may receive the first image from the external device 300.

The cloud server 200 may input the first image into the first neural network model to obtain a first object recognition result predicted by the first neural network model.

The second camera provided in the electronic device 100 may obtain a second image by capturing, from a second viewpoint, the same space photographed by the first camera provided in the external device 100. The electronic device 100 may transmit the second image to the cloud server 200. The cloud server 200 may receive the second image from the electronic device 100.

The cloud server 200 may convert the first object recognition result predicted by the first neural network model, based on a conversion relationship between a first camera coordinate system corresponding to the first camera of the external device 300 and a second camera coordinate system corresponding to the second camera of the electronic device 100. The cloud server 200 may use the first object recognition result converted with respect to the second viewpoint, as a label for the second image.

The cloud server 200 may generate training data by performing labeling on the second image corresponding to the first image captured from the first viewpoint by the first camera of the external device 300, based on the first object recognition result converted with respect to the second viewpoint. The cloud server 200 may transmit the generated training data to the electronic device 100 equipped with the second neural network model. In this case, the electronic device 100 may train the second neural network model equipped therein by using the received training data.

The cloud server 200 may train the second neural network model by using the generated training data. When the second neural network model is trained by the cloud server 200, the cloud server 200 may transmit updated network parameter values of the trained second neural network model to the electronic device 100 equipped with the second neural network model. The electronic device 100 may update the second neural network model based on the received updated network parameter values.

Figure 17:
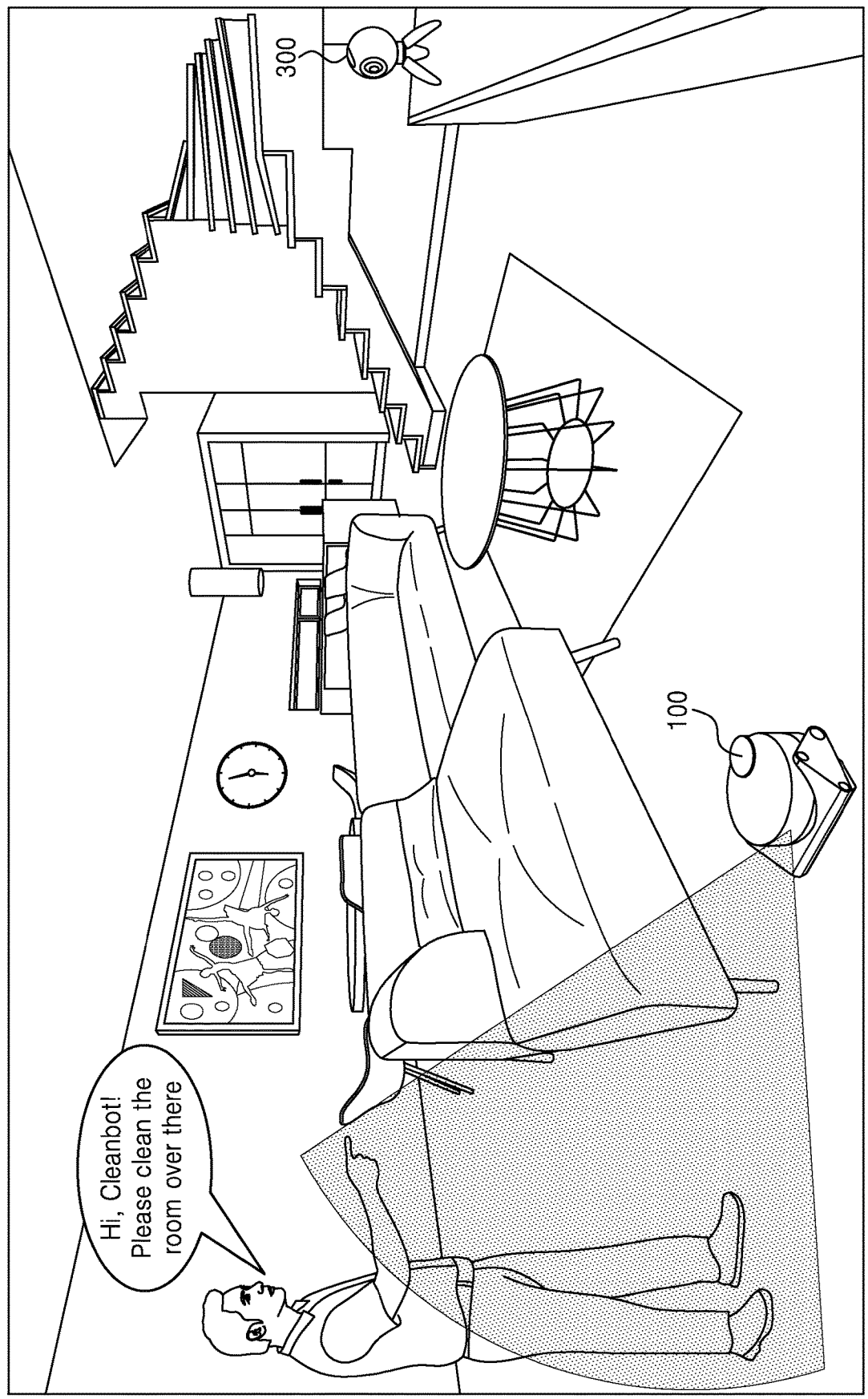
FIG. 17 illustrates, an example in which an electronic device performs a task by recognizing a user's pose, according to an embodiment of the disclosure.

FIG. 17 is a diagram for describing an example in which the electronic device 100 performs a task by recognizing a user's pose.

Referring to FIG. 17, the electronic device 100 is a robot vacuum cleaner configured to recognize pose information of a user and perform cleaning. When a neural network model equipped in the robot vacuum cleaner is trained to recognize pose information of the user according to the method described above, robot vacuum cleaner is able to recognize pose information or gesture information of the user even through an image captured in a low-angle view.

As illustrated in FIG. 17, when the user gives a voice command saying "Hi, Cleanbot! Please clean the room over there", the robot vacuum cleaner is able to recognize, through a neural network model configured to perform natural language processing, that a cleaning command has been initiated by the user, but may be unable to specify the specific location of 'the room over there'. In this case, the robot vacuum cleaner may identify the room that the user is pointing at, by checking pose information of the user estimated by a neural network model configured to perform object detection and pose recognition. As a result, the robot vacuum cleaner may confirm the command to clean the room identified according to the estimated pose information of the user, and then perform cleaning.

Figure 18:
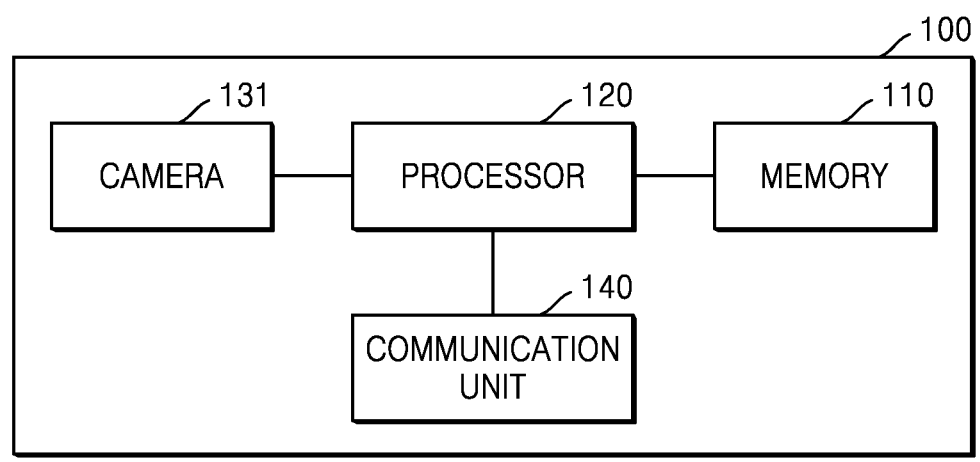
FIGS. 18 and 19 illustrate configurations of an electronic device, according to an embodiment of the disclosure.
Figure 19:
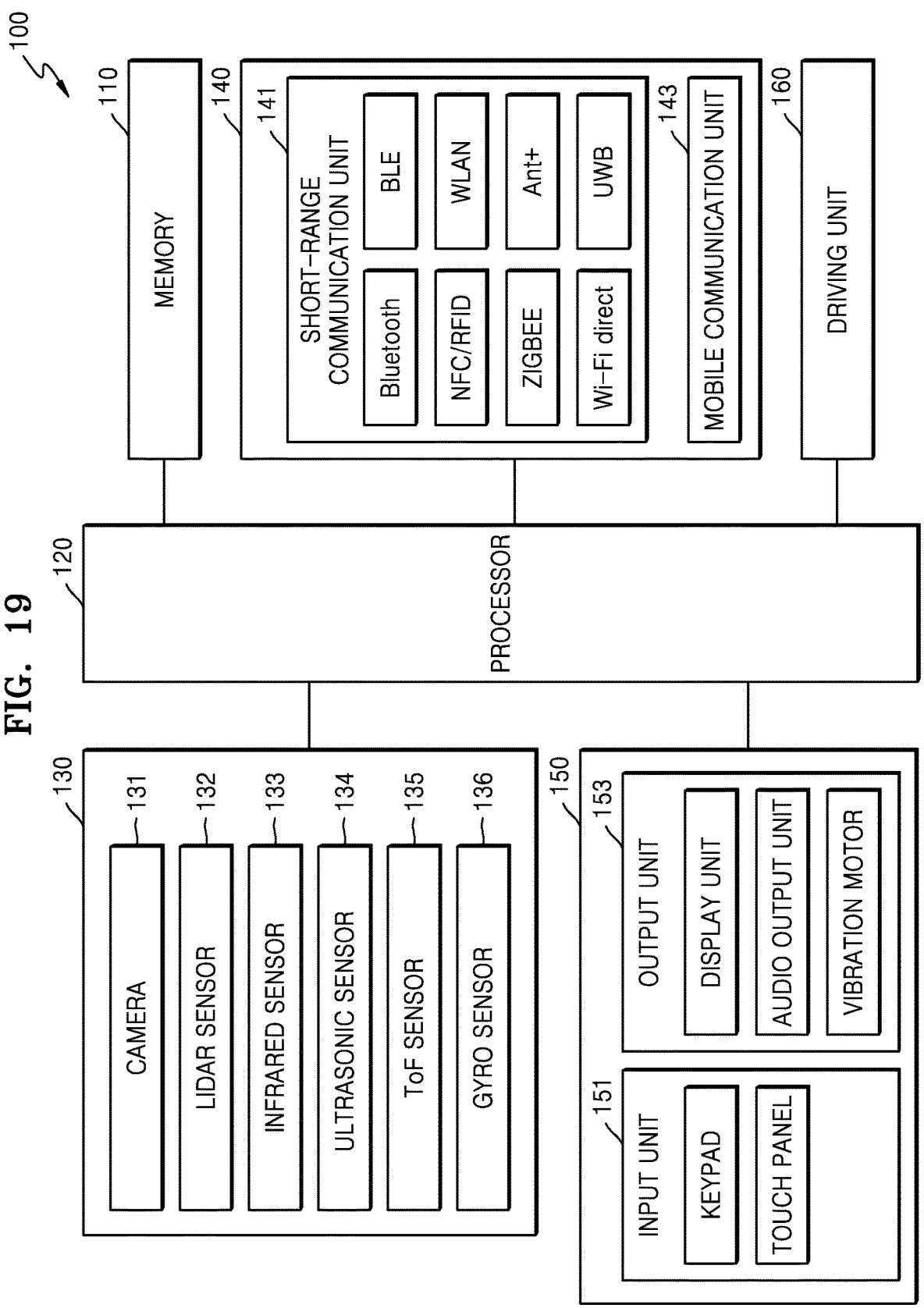

FIGS. 18 and 19 are block diagrams illustrating configurations of the electronic device 100, according to an embodiment of the disclosure.

Referring to FIG. 18, the electronic device 100 according to an embodiment of the disclosure may include a memory 110, a processor 120, a camera 131, and a communication unit 140, but is not limited thereto and may further include general-purpose components. For example, as illustrated in FIG. 19, in addition to the memory 110, the processor 120, the camera 131, and a communication unit 140, the electronic device 100 may further include the sensing unit 130 including the camera 131, an input/output unit 150, and a driving unit 160. Hereinafter, each component will be described in detail with reference to FIGS. 18 and 19.

The memory 110 according to an embodiment of the disclosure may store a program for the processor 120 to perform processing and control, and may store data input to or generated by the electronic device 100. The memory 110 may store instructions, data structures, and program code that are readable by the processor 120. In an embodiment of the disclosure, operations performed by the processor 120 may be implemented by executing instructions or code of a program stored in the memory 110.

The memory 110 according to an embodiment of the disclosure may include a flash memory-type memory, a hard disk-type memory, a multimedia card micro-type memory, a card-type memory (e.g., an SD memory, an XD memory, etc.), a non-volatile memory including at least one of read-only memory (ROM), electrically erasable programmable ROM (EEPROM), programmable ROM (PROM), a magnetic memory, a magnetic disk, or an optical disk, and a volatile memory such as random-access memory (RAM) or static RAM (SRAM).

The memory 110 according to an embodiment of the disclosure may store at least one instruction and/or programs for controlling the electronic device 100 to train a neural network model. For example, the memory 110 may store an object recognition result conversion module, a training data generation module, a training module, etc.

The processor 120 according to an embodiment of the disclosure may execute instructions or a programmed software module stored in the memory 110 to control operations or functions of the electronic device 100 to perform a task. The processor 120 may include a hardware component that performs arithmetic operations, logic operations, input/output operations, and signal processing. The processor 120 may execute at least one instruction stored in the memory 110 to control overall operations of the electronic device 100 to train a neural network model and perform a task by using the trained neural network model. The processor 120 may execute programs stored in the memory 110 to control the camera 131 or the sensing unit 130 including the camera 131, the communication unit 140, the input/output unit 150, and the driving unit 160.

For example, the processor 120 according to an embodiment of the disclosure may include, but is not limited to, at least one of a central processing unit (CPU), a microprocessor, a graphics processing unit (GPU), an application-specific integrated circuits (ASIC), a digital signal processor (DSP), a digital signal processing device (DSPDs), a programmable logic device (PLD), a field-programmable gate array (FPGAs), an application processor, a neural processing unit, or a dedicated artificial intelligence processor designed in a hardware structure specialized for processing an artificial intelligence model. Each processor constituting the processor 120 may be a dedicated processor for performing a certain function.

An AI processor according to an embodiment of the disclosure may use an AI model to perform computation and control to process a task that the electronic device 100 is set to perform. The AI processor may be manufactured in the form of a dedicated hardware chip for AI, or may be manufactured as part of a general-purpose processor (e.g., a CPU or an application processor) or a dedicated graphics processor (e.g., a GPU), and mounted on the electronic device 100.

The sensing unit 130 according to an embodiment of the disclosure may include a plurality of sensors configured to detect information about a surrounding environment of the electronic device 100. For example, the sensing unit 130 may include a camera 131, a Light Detection and Ranging (LiDAR) sensor 132, an infrared sensor 133, an ultrasonic sensor 134, a ToF sensor 135, a gyro sensor 136, etc., but is not limited thereto.

The camera 131 according to an embodiment of the disclosure may include a stereo camera, a mono camera, a wide-angle camera, an around-view camera, a three-dimensional vision sensor, etc.

The LiDAR sensor 132 may detect the distance to an object and various physical properties by emitting laser toward a target. The LiDAR sensor 132 may be used to detect surrounding objects, geographical features, etc. and model them into three-dimensional images.

The infrared sensor 133 may be any one of an active infrared sensor configured to emit infrared radiation and detect changes due to blockage of light, and a passive infrared sensor that does not have a light emitter and is configured to only detect changes in infrared rays received from the outside. For example, an infrared proximity sensor may be installed around a wheel of the electronic device 100 to be used as a fall prevention sensor by emitting infrared rays toward the floor and then receiving them.

The ultrasonic sensor 134 may measure the distance to an object by using ultrasonic waves, and may emit and detect ultrasonic pulses that convey information about the proximity of the object. The ultrasonic sensor 134 may be used to detect nearby objects and transparent objects.

The ToF sensor 135 may calculate the distance at which light emitted toward an object is reflected and returns in terms of time, to obtain a three-dimensional effect, movement, and spatial information of the object. The ToF sensor 135 may enable high-level recognition of objects in complex spaces and dark places, and even obstacles in front of the eyes, to allow the electronic device 100 to avoid obstacles.

The gyro sensor 136 may detect angular velocity. The gyro sensor 136 may be used to measure the position of the electronic device 100 and set the direction of the electronic device 100.

According to an embodiment of the disclosure, the sensing unit 130 may be used to photograph a space including at least one object by using the camera 131 and generate spatial information. The electronic device 100 may obtain spatial information about a space including at least one object by obtaining spatial scan information or object information by using a plurality of sensors of the same type or different types among the camera 131, the LiDAR sensor 132, the infrared sensor 133, the ultrasonic sensor 134, the ToF sensor 135, and the gyro sensor 136. However, even in a case in which the electronic device 100 includes a sensor configured to identify depth information, such as the LiDAR sensor 132 or the ToF sensor 135, it may be difficult for the electronic device 100 to detect an object due to the direction of the object or the distance or relative position between the object and the electronic device 100.

The communication unit 140 may include one or more components configured to enable communication between the electronic device 100 and an external device such as the cloud server 200, the IoT devices 300-1, 300-2, and 300-3, or a user terminal. For example, the communication unit 140 may include a short-range wireless communication unit 141, a mobile communication unit 142, etc., but is not limited thereto.

The short-range wireless communication unit 141 may include a Bluetooth communication unit, a Bluetooth Low Energy (BLE) communication unit, a near-field communication unit, a wireless local area network (WLAN) (e.g., Wi-Fi) communication unit, a Zigbee communication unit, an Ant+ communication unit, a Wi-Fi Direct (WFD) communication unit, an ultra-wideband (UWB) communication unit, an Infrared Data Association (IrDA) communication unit, a microwave (uWave) communication unit, etc., but is not limited thereto.

The mobile communication unit 142 transmits and receives radio signals to and from at least one of a base station, an external terminal, or a server, on a mobile communication network. Here, the radio signals may include a voice call signal, a video call signal, or various types of data according to text/multimedia message transmission and reception.

As illustrated in FIG. 19, the electronic device 100 may further include the input/output unit 150 and a driving unit 160, and although not illustrated in FIG. 19, may further include a component such as a power supply unit.

The input/output unit 150 may include an input unit 151 and an output unit 153. The input/output unit 150 may include the input unit 151 and the output unit 153 that are separate from each other, or may include a component in which they are integrated, such as a touch screen. The input/output unit 150 may receive input information from a user and provide output information to the user.

The input unit 151 may refer to a unit through which the user inputs data for controlling the electronic device 100. For example, the input unit 151 may include a keypad, a touch panel (e.g., a touch-type capacitive touch pad, a pressure-type resistive overlay touch pad, an infrared sensor-type touch pad, a surface acoustic wave conduction touch pad, an integration-type tension measurement touch pad, a piezoelectric effect-type touch pad), etc. In addition, the input unit 151 may include a jog wheel, a jog switch, etc., but is not limited thereto.

The output unit 153 may output an audio signal, a video signal, or a vibration signal, and may include a display unit, an audio output unit, and a vibration motor.

The display unit may display information processed by the electronic device 100. For example, the display unit may display a user interface for receiving a user manipulation. In a case in which the display unit and the touch pad constitute a layer structure to form a touch screen, the display may serve as an input device in addition to an output device. The display unit may include at least one of a liquid-crystal display, a thin-film-transistor liquid-crystal display, an organic light-emitting diode, a flexible display, or a three-dimensional (3D) display. The electronic device 100 may include two or more display units depending on an implementation of the electronic device 100.

The audio output unit may output audio data stored in the memory 110. The audio output unit may output an audio signal related to a function performed by the electronic device 100. The audio output unit may include a speaker, a buzzer, etc.

The vibration motor may output a vibration signal. For example, the vibration motor may output a vibration signal corresponding to an output of audio data or video data. The vibration motor may output a vibration signal when a touch is input to the touch screen.

The driving unit 160 may include components used for operating (driving) the electronic device 100 and internal devices of the electronic device 100. In a case in which the electronic device 100 is a robot vacuum cleaner, the driving unit 160 may include a suction unit, a traveling unit, etc., but is not limited thereto, and the driving unit 160 may vary depending on the type of the electronic device 100.

The suction unit functions to collect dust on the floor while suctioning air, and may include, but is not limited to, a rotation brush or broom, a rotation brush motor, an air suction port, a filter, a dust collecting chamber, an air discharge port, and the like. The suction unit may be mounted in a structure in which an additional brush for sweeping out dust from a corner is rotatable.

The traveling unit may include, but is not limited to, a motor that rotates each wheel installed in the electronic device 100, and a timing belt installed to transmit power generated from the wheels.

According to an embodiment of the disclosure, the processor 120 may execute at least one instruction stored in the memory 110 to obtain, through the communication unit 140, a first object recognition result predicted by a first neural network model using, as an input, a first image captured from a first viewpoint by a camera of the external device 300 capturing a space including at least one object. The processor 120 may execute the at least one instruction stored in the memory 110 to convert the predicted first object recognition result based on a conversion relationship between a first camera coordinate system corresponding to the camera of the external device 300 and a second camera coordinate system corresponding to the camera 131 capturing, from a second viewpoint, the space. The processor 120 may execute the at least one instruction stored in the memory 110 to generate training data by performing labeling on a second image that corresponds to the first image and is captured by the camera 131, based on the first object recognition result converted with respect to the second viewpoint. The processor 120 may execute the at least one instruction stored in the memory 110 to train a second neural network model by using the generated training data.

According to an embodiment of the disclosure, the processor 120 may execute the at least one instruction stored in the memory 110 to, based on the conversion relationship between the first camera coordinate system corresponding to the camera of the external device 300 and the second camera coordinate system corresponding to the camera 131, convert three-dimensional pose information including spatial coordinates of feature points representing a position and a direction of an object identified in the first image, into two-dimensional pose information including image coordinates of feature points representing a position of the object identified in the second image. The processor 120 may execute the at least one instruction stored in the memory 110 to generate the training data by performing labeling on the second image such that the two-dimensional pose information included in the first object recognition result converted with respect to the second viewpoint is used as two-dimensional pose information of the object in the second image.

According to an embodiment of the disclosure, the processor 120 may execute the at least one instruction stored in the memory 110 to, based on a conversion relationship between the first camera coordinate system and a world coordinate system, convert the three-dimensional pose information in the first camera coordinate system into three-dimensional pose information in the world coordinate system. The processor 120 may execute the at least one instruction stored in the memory 110 to, based on a conversion relationship between the world coordinate system and the second camera coordinate system, convert the three-dimensional pose information in the world coordinate system into three-dimensional pose information in the second camera coordinate system. The processor 120 may execute the at least one instruction stored in the memory 110 to convert the three-dimensional pose information in the second camera coordinate system into two-dimensional pose information in the second image coordinate system by projecting spatial coordinates in the second camera coordinate system to a second image coordinate system of the second camera.

According to an embodiment of the disclosure, the processor 120 may execute the at least one instruction stored in the memory 110 to obtain the conversion relationship between the first camera coordinate system and the world coordinate system by performing first camera calibration to obtain internal parameters of the camera of the external device 300 and external parameters of the camera of the external device 300 using matching pairs of spatial coordinates of a certain number of feature points in the world coordinate system and image coordinates of the feature points in the image coordinate system of the camera of the external device 300. Here, the feature points may be detected by moving the electronic device 100 within the field of view of the camera of the external device 300 and detecting the center point of a certain detection area, a marker attached to the electronic device 100, or a feature of the appearance of the electronic device 100.

According to an embodiment of the disclosure, the processor 120 may execute the at least one instruction stored in the memory 110 to generate the training data by performing labeling on the second image such that, among the two-dimensional pose information included in the first object recognition result converted with respect to the second viewpoint, a first part corresponding to the second image is distinguished from a second part that does not correspond to the second image.

According to an embodiment of the disclosure, the processor 120 may execute the at least one instruction stored in the memory 110 to, in a case in which plurality of second images are captured by the camera 131 from the second viewpoint, generate the training data by performing labeling on each of the plurality of second images, based on the first object recognition result converted with respect to the second viewpoint.

According to an embodiment of the disclosure, the processor 120 may execute the at least one instruction stored in the memory 110 to, in a case in which a plurality of second images are captured by the camera 131 respectively from a plurality of different second viewpoints, convert the predicted first object recognition result based on a conversion relationship between the first camera coordinate system and the second camera coordinate system for each of the plurality of second viewpoints. The processor 120 may execute the at least one instruction stored in the memory 110 to generate the training data by performing labeling on each of the plurality of second images, based on the first object recognition result converted with respect to each of the plurality of second viewpoints.

According to an embodiment of the disclosure, the processor 120 may execute the at least one instruction stored in the memory 110 to generate the training data, in a case in which the electronic device 100 recognizes an object at a lower level than a preset standard, or moves to a position specified in a spatial map used by the electronic device 100.

Figure 20:
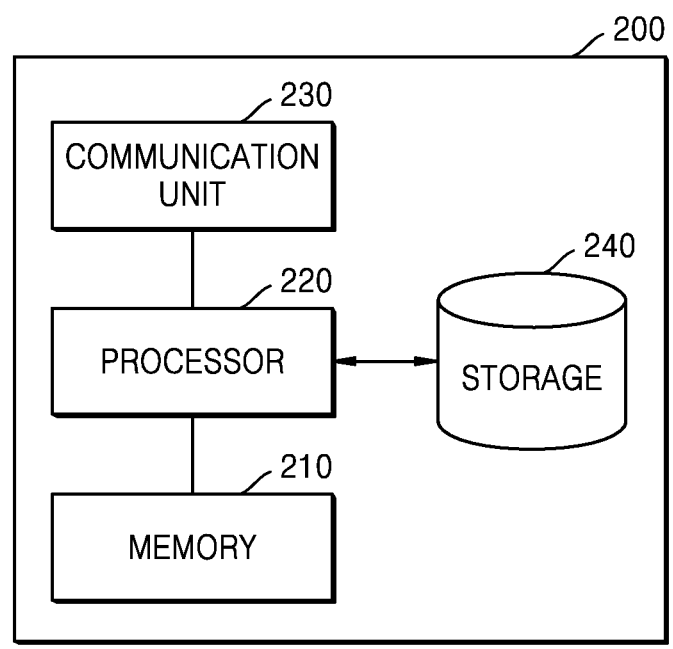
FIG. 20 illustrates a configuration of a server according to an embodiment of the disclosure.

FIG. 20 is a block diagram illustrating a configuration of a server 200 according to an embodiment of the disclosure.

The operations of the electronic device 100 described above may be performed by the server 200 in a similar manner. The server 200 according to an embodiment of the disclosure may include a memory 210, a processor 220, a communication unit 230, and a storage 240. The components of the server 200 may correspond to the memory 110, the processor 120, and the communication unit 140 of the electronic device 100 of FIGS. 18 and 19, respectively, and thus, the descriptions provided above will be omitted.

The memory 210 may store various pieces of data, programs, or applications for operating and controlling the server 200. At least one instruction or applications stored in the memory 210 may be executed by the processor 220. The memory 210 may store a module configured to perform the same function as a module stored in the electronic device 100. For example, the memory 210 may store an object recognition result conversion module, a training data generation module, a training module, a prediction module, and data and program instruction code corresponding thereto. The processor 220 may control the overall operation of the server 200. The processor 220 according to an embodiment of the disclosure may execute at least one instruction stored in the memory 210.

The communication unit 230 may include one or more components configured to enable communication through a LAN, a wide area network (WAN), a value-added network (VAN), a mobile radio communication network, a satellite communication network, and a combination thereof.

The storage 240 may store a first neural network model or a second neural network model. The storage 240 may store training datasets used to train various AI models.

The server 200 according to an embodiment of the disclosure may be a device having higher computing performance than that of the electronic device 100 and thus capable of performing a larger amount of computation. The server 200 may perform training of an AI model requiring a relatively large amount of computation.

According to an embodiment of the disclosure, the processor 220 may execute at least one instruction stored in the memory 210 to obtain a first object recognition result predicted by a first neural network model using, as an input, a first image captured by a first camera capturing a space including at least one object from a first viewpoint. The processor 220 may execute the at least one instruction stored in the memory 210 to obtain, through the communication unit 230, a second image captured by a second camera capturing, from a second viewpoint, the space. The processor 220 may execute the at least one instruction stored in the memory 210 to convert the predicted first object recognition result based on a conversion relationship between a first camera coordinate system corresponding to the first camera and a second camera coordinate system corresponding to the second camera. The processor 220 may execute the at least one instruction stored in the memory 210 to generate training data by performing labeling on the second image corresponding to the first image, based on the first object recognition result converted with respect to the second viewpoint. The processor 220 may execute the at least one instruction stored in the memory 210 to train a second neural network model by using the generated training data.

According to an embodiment of the disclosure, the processor 220 may execute the at least one instruction stored in the memory 210 to transmit, through the communication unit 230, network parameter values of the trained second neural network model to an electronic device 100 equipped with the second neural network model.

An embodiment of the disclosure may be implemented as a recording medium including computer-executable instructions such as a computer-executable program module. A computer-readable medium may be any available medium which is accessible by a computer, and may include a volatile or non-volatile medium and a detachable and non-detachable medium. Also, the computer-readable medium may include a computer storage medium and a communication medium. The computer storage media include both volatile and non-volatile, detachable and non-detachable media implemented in any method or technique for storing information such as computer readable instructions, data structures, program modules or other data. The communication medium may typically include computer-readable instructions, data structures, or other data of a modulated data signal such as program modules.

In addition, the computer-readable storage medium may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

According to an embodiment of the disclosure, the method according to an embodiment disclosed herein may be included in a computer program product and then provided. The computer program product may be traded as commodities between sellers and buyers. The computer program product may be distributed in the form of a machine-readable storage medium (e.g., a compact disc (CD) ROM (CD-ROM), or may be distributed online (e.g., downloaded or uploaded) through an application store or directly between two user devices (e.g., smart phones). In a case of online distribution, at least a portion of the computer program product (e.g., a downloadable app) may be temporarily stored in a machine-readable storage medium such as a manufacturer's server, an application store's server, or a memory of a relay server.

According to an embodiment of the disclosure, provided is a method of training a neural network model. The method of training a neural network model includes obtaining a first object recognition result predicted by a first neural network model using, as an input, a first image captured by a first camera capturing a space including at least one object from a first viewpoint (S1310). In addition, the method of training a neural network model further includes converting the predicted first object recognition result based on a conversion relationship between a first camera coordinate system corresponding to the first camera and a second camera coordinate system corresponding to a second camera capturing, from a second viewpoint, the space (S1320). In addition, the method of training a neural network model further includes generating training data by performing labeling on a second image that corresponds to the first image and is captured by the second camera, based on the first object recognition result converted with respect to the second viewpoint (S1330). In addition, the method of training a neural network model further includes training a second neural network model by using the generated training data (S1340).

In addition, according to an embodiment of the disclosure, the converting of the predicted first object recognition result (S1320) includes, based on the conversion relationship, converting three-dimensional pose information comprising spatial coordinates of feature points representing a position and a direction of an object identified in the first image, into two-dimensional pose information comprising image coordinates of feature points representing a position of the object identified in the second image. In addition, the generating of the training data (S1330) includes generating the training data by performing labeling on the second image such that the two-dimensional pose information included in the first object recognition result converted with respect to the second viewpoint is used as two-dimensional pose information of the object in the second image.

In addition, the converting of the predicted first object recognition result (S1320) further includes, based on a conversion relationship between the first camera coordinate system and a world coordinate system, converting the three-dimensional pose information in the first camera coordinate system into three-dimensional pose information in the world coordinate system. In addition, the converting of the predicted first object recognition result (S1320) further includes, based on a conversion relationship between the world coordinate system and the second camera coordinate system, converting the three-dimensional pose information in the world coordinate system into three-dimensional pose information in the second camera coordinate system. In addition, the converting of the predicted first object recognition result (S1320) further includes converting the three-dimensional pose information in the second camera coordinate system into two-dimensional pose information in the second image coordinate system by projecting spatial coordinates in the second camera coordinate system to a second image coordinate system of the second camera.

In addition, the conversion relationship between the first camera coordinate system and the world coordinate system may be obtained by performing first camera calibration to obtain internal parameters of the first camera and external parameters of the first camera using matching pairs of spatial coordinates of a certain number of feature points in the world coordinate system and image coordinates of the feature points in the image coordinate system of the first camera. In addition, the feature points may be detected by moving the electronic device 100 within the field of view of the first camera and detecting the center point of a certain detection area, a marker attached to the electronic device 100, or a feature of the appearance of the electronic device 100.

In addition, the generating of the training data (S1330) further includes generating the training data by performing labeling on the second image such that, among the two-dimensional pose information included in the first object recognition result converted with respect to the second viewpoint, a first part corresponding to the second image is distinguished from a second part that does not correspond to the second image.

In addition, according to an embodiment of the disclosure, in a case in which a plurality of second images are captured by the second camera from the second viewpoint, the generating of the training data (S1330) includes generating the training data by performing labeling on each of the plurality of second images, based on the first object recognition result converted with respect to the second viewpoint.

In addition, the plurality of second images captured from the second viewpoint are captured by capturing a dynamic object at preset time intervals while the second camera maintains the second viewpoint.

In addition, according to an embodiment of the disclosure, in a case in which a plurality of second images are captured by the second camera respectively from a plurality of different second viewpoints, the converting (S1320) includes converting the predicted first object recognition result based on a conversion relationship between the first camera coordinate system and the second camera coordinate system for each of the plurality of second viewpoints. In addition, the generating of the training data (S1330) includes generating the training data by performing labeling on each of the plurality of second images, based on the first object recognition result converted with respect to each of the plurality of second viewpoints.

In addition, the plurality of second images captured respectively from the plurality of different second viewpoints are captured from the plurality of different second viewpoints while the second camera mounted on the electronic device 100 circles around a static object, or changes a distance to the static object.

In addition, according to an embodiment of the disclosure, the generating of the training data (S1330) includes generating the training data, in a case in which the electronic device 100 equipped with the second camera recognizes an object at a lower level than a preset standard, or moves to a position specified in a spatial map used by the electronic device 100.

According to an embodiment of the disclosure, the electronic device 100 includes the memory 110, the processor 120 configured to execute at least one instruction stored in the memory 110, the camera 131, and the communication unit 140. In addition, the processor 120 executes at least one instruction to obtain, through the communication unit 140, a first object recognition result predicted by a first neural network model using, as an input, a first image captured from a first viewpoint by a camera of the external device 300 capturing a space including at least one object. In addition, the processor 120 executes the at least one instruction to convert the predicted first object recognition result based on a conversion relationship between a first camera coordinate system corresponding to the camera of the external device 300 and a second camera coordinate system corresponding to the camera 131 capturing, from a second viewpoint, the space. In addition, the processor 120 executes the at least one instruction to generate training data by performing labeling on a second image that corresponds to the first image and is captured by the camera 131, based on the first object recognition result converted with respect to the second viewpoint. In addition, the processor 120 executes the at least one instruction to train a second neural network model by using the generated training data.

In addition, according to an embodiment of the disclosure, the processor 120 executes the at least one instruction to, based on the conversion relationship, convert three-dimensional pose information including spatial coordinates of feature points representing a position and a direction of an object identified in the first image, into two-dimensional pose information including image coordinates of feature points representing a position of the object identified in the second image. In addition, the processor 120 executes the at least one instruction to generate the training data by performing labeling on the second image such that the two-dimensional pose information included in the first object recognition result converted with respect to the second viewpoint is used as two-dimensional pose information of the object in the second image.

In addition, the processor 120 executes the at least one instruction to, based on a conversion relationship between the first camera coordinate system and a world coordinate system, convert the three-dimensional pose information in the first camera coordinate system into three-dimensional pose information in the world coordinate system. In addition, the processor 120 executes the at least one instruction to, based on a conversion relationship between the world coordinate system and the second camera coordinate system, convert the three-dimensional pose information in the world coordinate system into three-dimensional pose information in the second camera coordinate system. In addition, the processor 120 executes the at least one instruction to convert the three-dimensional pose information in the second camera coordinate system into two-dimensional pose information in the second image coordinate system by projecting spatial coordinates in the second camera coordinate system to a second image coordinate system of the camera.

In addition, the processor 120 executes the at least one instruction to obtain the conversion relationship between the first camera coordinate system and the world coordinate system by performing first camera calibration to obtain internal parameters of the camera of the external device 300 and external parameters of the camera of the external device 300 using matching pairs of spatial coordinates of a certain number of feature points in the world coordinate system and image coordinates of the feature points in the image coordinate system of the camera of the external device 300. In addition, the feature points are detected by moving the electronic device 100 within the field of view of the camera of the external device 300 and detecting the center point of a certain detection area, a marker attached to the electronic device 100, or a feature of the appearance of the electronic device 100.

In addition, the processor 120 executes the at least one instruction to generate the training data by performing labeling on the second image such that, among the two-dimensional pose information included in the first object recognition result converted with respect to the second viewpoint, a first part corresponding to the second image is distinguished from a second part that does not correspond to the second image.

In addition, according to an embodiment of the disclosure, the processor 120 executes the at least one instruction to, in a case in which a plurality of second images are captured by the camera 131 from the second viewpoint, generate the training data by performing labeling on each of the plurality of second images, based on the first object recognition result converted with respect to the second viewpoint.

In addition, according to an embodiment of the disclosure, the processor 120 executes the at least one instruction to, in a case in which a plurality of second images are captured by the camera 131 respectively from a plurality of different second viewpoints, convert the predicted first object recognition result based on a conversion relationship between the first camera coordinate system and the second camera coordinate system for each of the plurality of second viewpoints, and generate the training data by performing labeling on each of the plurality of second images, based on the first object recognition result converted with respect to each of the plurality of second viewpoints.

In addition, according to an embodiment of the disclosure, the processor 120 executes the at least one instruction to generate the training data, in a case in which the electronic device 100 recognizes an object at a lower level than a preset standard, or moves to a position specified in a spatial map used by the electronic device 100.

According to an embodiment of the disclosure, the cloud server 200 includes the memory 210, the processor 220 configured to execute at least one instruction stored in the memory 210, and the communication unit 230. The processor 220 executes at least one instruction to obtain a first object recognition result predicted by a first neural network model using, as an input, a first image captured by a first camera capturing a space including at least one object from a first viewpoint. In addition, the processor 220 executes the at least one instruction to obtain, through the communication unit 230, a second image captured by a second camera capturing, from a second viewpoint, the space. In addition, the processor 220 executes the at least one instruction to convert the predicted first object recognition result based on a conversion relationship between a first camera coordinate system corresponding to the first camera and a second camera coordinate system corresponding to the second camera. In addition, the processor 220 executes the at least one instruction to generate training data by performing labeling on the second image corresponding to the first image, based on the first object recognition result converted with respect to the second viewpoint. In addition, the processor 220 executes the at least one instruction to train a second neural network model by using the generated training data.

According to an embodiment of the disclosure, the processor 220 executes the at least one instruction to transmit network parameter values of the trained second neural network model to the electronic device 100 equipped with the second neural network model through the communication unit 230.

While the disclosure have been particularly shown and described, it will be understood by one of ordinary skill in the art that various changes in form and details may be made therein without departing from the spirit and scope of the disclosure. Therefore, it should be understood that the above-described embodiment is exemplary in all respects and does not limit the scope of the disclosure. For example, each element described in a single type may be executed in a distributed manner, and elements described distributed may also be executed in an integrated form.

The scope of the disclosure is not defined by the detailed description of the disclosure but by the following claims, and all modifications or alternatives derived from the scope and spirit of the claims and equivalents thereof fall within the scope of the disclosure.

What is claimed is:

1. A computer-implemented method of training a neural network model by augmenting images representing objects captured by multiple cameras, the computer-implemented method comprising:
    obtaining a first object recognition result predicted by a first neural network model using, as an input, a first image captured by a first camera facing, from a first viewpoint, a space including at least one object;
    capturing a second image by a second camera facing the space from a second viewpoint;
    obtaining a label for the second image by converting the obtained first object recognition result, based on a conversion relationship between a first camera coordinate system corresponding to the first camera and a second camera coordinate system corresponding to the second camera;
    generating, based on the first object recognition result converted with respect to the second viewpoint, training data by performing labeling, using the obtained label for the second image, on the second image that corresponds to the first image; and
    training a second neural network model by using the generated training data.

2. The computer-implemented method of claim 1, wherein the converting of the obtained first object recognition result comprises, based on the conversion relationship, converting three-dimensional pose information into two-dimensional pose information,
    wherein the three-dimensional pose information comprises spatial coordinates of feature points representing a position and a direction of an object identified in the first image,
    wherein the two-dimensional pose information comprises image coordinates of feature points representing a position of the object identified in the second image, and
    wherein the generating of the training data comprises generating the training data by performing labeling on the second image such that the two-dimensional pose information included in the first object recognition result converted with respect to the second viewpoint is used as two-dimensional pose information of the object in the second image.

3. The computer-implemented method of claim 2, wherein the converting of the obtained first object recognition result further comprises:
    based on a conversion relationship between the first camera coordinate system and a world coordinate system, converting the three-dimensional pose information in the first camera coordinate system into three-dimensional pose information in the world coordinate system;
    based on a conversion relationship between the world coordinate system and the second camera coordinate system, converting the three-dimensional pose information in the world coordinate system into three-dimensional pose information in the second camera coordinate system; and
    converting the three-dimensional pose information in the second camera coordinate system into two-dimensional pose information in a second image coordinate system of the second camera by projecting spatial coordinates in the second camera coordinate system to the second image coordinate system of the second camera.

4. The computer-implemented method of claim 3, wherein the conversion relationship between the first camera coordinate system and the world coordinate system is obtained by performing first camera calibration to obtain internal parameters of the first camera and external parameters of the first camera using matching pairs of spatial coordinates of a number of feature points in the world coordinate system and image coordinates of the feature points in a first image coordinate system of the first camera, and
    wherein the feature points are detected by moving an electronic device within a field of view of the first camera and detecting a center point of a detection area, a marker attached to the electronic device, or an appearance of the electronic device.

5. The computer-implemented method of claim 2, wherein the generating of the training data further comprises generating the training data by performing labeling on the second image such that, among the two-dimensional pose information included in the first object recognition result converted with respect to the second viewpoint, a first part corresponding to the second image is distinguished from a second part that does not correspond to the second image.

6. The computer-implemented method of claim 1, wherein, based on a plurality of second images that are captured by the second camera from the second viewpoint, the generating of the training data comprises generating the training data by performing labeling on at least one of the plurality of second images, based on the first object recognition result converted with respect to the second viewpoint.

7. The computer-implemented method of claim 6, wherein the plurality of second images captured from the second viewpoint are captured by capturing a dynamic object at preset time intervals, and
    wherein the second camera is configured to maintain the second viewpoint.

8. The computer-implemented method of claim 1, wherein, based on a plurality of second images that are captured by the second camera respectively from a plurality of different second viewpoints, the converting comprises converting the obtained first object recognition result, based on a conversion relationship between the first camera coordinate system and the second camera coordinate system for at least one of the plurality of second viewpoints, and
    wherein the generating of the training data comprises generating the training data by performing labeling on at least one of the plurality of second images, based on the first object recognition result converted with respect to the at least one of the plurality of second viewpoints.

9. The computer-implemented method of claim 8, wherein the plurality of second images captured respectively from the plurality of different second viewpoints are captured from the plurality of different second viewpoints, and
    wherein the second camera mounted on an electronic device is configured to circle around a static object, or changes a distance to the static object.

10. The computer-implemented method of claim 1, wherein the generating of the training data comprises generating the training data, based on an electronic device equipped with the second camera, which is configured to recognize an object at a lower level than a preset standard, or to move to a position specified in a spatial map used by the electronic device.

11. An electronic device communicated with an external device including a first camera, comprising:
a second camera;
a communication unit;
a memory configured to store at least one instruction;
at least one processor operatively connected to the second camera, the communication unit, and the memory and configured to execute the at least one instruction to;
obtain, through the communication unit, a first object recognition result predicted by a first neural network model using, as an input, a first image captured from a first viewpoint by the first camera of the external device facing a space including at least one object,
capture a second image by the second camera facing the space from a second viewpoint,
obtain a label for the second image by converting the obtained first object recognition result, based on a conversion relationship between a first camera coordinate system corresponding to the first camera of the external device and a second camera coordinate system corresponding to the second camera,
generate training data by performing labeling, using the obtained label for the second image, on the second image that corresponds to the first image, based on the first object recognition result converted with respect to the second viewpoint, and
train a second neural network model by using the generated training data.

12. The electronic device of claim 11, wherein the at least one processor is further configured to execute the at least one instruction to:
based on the conversion relationship, convert three-dimensional pose information into two-dimensional pose information,
wherein the three-dimensional pose information comprises spatial coordinates of feature points representing a position and a direction of an object identified in the first image, and
wherein the two-dimensional pose information comprises image coordinates of feature points representing a position of the object identified in the second image, and
generate the training data by performing labeling on the second image such that the two-dimensional pose information included in the first object recognition result converted with respect to the second viewpoint is used as two-dimensional pose information of the object in the second image.

13. The electronic device of claim 12, wherein the at least one processor is further configured to execute the at least one instruction to:
based on a conversion relationship between the first camera coordinate system and a world coordinate system, convert the three-dimensional pose information in the first camera coordinate system into three-dimensional pose information in the world coordinate system,
based on a conversion relationship between the world coordinate system and the second camera coordinate system, convert the three-dimensional pose information in the world coordinate system into three-dimensional pose information in the second camera coordinate system, and convert the three-dimensional pose information in the second camera coordinate system into two-dimensional pose information in a second image coordinate system of the second camera by projecting spatial coordinates in the second camera coordinate system to the second image coordinate system of the second camera.

14. The electronic device of claim 13, wherein the at least one processor is further configured to execute the at least one instruction to obtain the conversion relationship between the first camera coordinate system and the world coordinate system by performing first camera calibration to obtain internal parameters of the second camera of the external device and external parameters of the second camera of the external device using matching pairs of spatial coordinates of a number of feature points in the world coordinate system and image coordinates of the feature points in the second image coordinate system of the second camera of the external device, and
wherein the feature points are detected by moving the electronic device within a field of view of the second camera of the external device and detecting a center point of a detection area, a marker attached to the electronic device, or an appearance of the electronic device.

15. The electronic device of claim 12, wherein the at least one processor is further configured to execute the at least one instruction to generate the training data by performing labeling on the second image such that, among the two-dimensional pose information included in the first object recognition result converted with respect to the second viewpoint, a first part corresponding to the second image is distinguished from a second part that does not correspond to the second image.

16. The electronic device of claim 11, wherein the at least one processor is further configured to execute the at least one instruction to, based on a plurality of second images that are captured by the first camera from the second viewpoint, generate the training data by performing labeling on at least one of the plurality of second images, based on the first object recognition result converted with respect to the second viewpoint.

17. The electronic device of claim 11, wherein the at least one processor is further configured to execute the at least one instruction to:
based on a plurality of second images that are captured by the first camera respectively from a plurality of different second viewpoints, convert the obtained first object recognition result, based on a conversion relationship between the first camera coordinate system and the second camera coordinate system for each of the plurality of second viewpoints, and
generate the training data by performing labeling on at least one of the plurality of second images, based on the first object recognition result converted with respect to each of the plurality of second viewpoints.

18. The electronic device of claim 11, wherein the at least one processor is further configured to execute the at least one instruction to generate the training data, and
wherein the electronic device is configured to recognize an object at a lower level than a preset standard, or to move to a position specified in a spatial map used by the electronic device.

19. A cloud server comprising:
a communication unit;
a memory storing at least one instruction;

at least one processor operatively connected to the communication unit and the memory and configured to execute the at least one instruction to:

obtain a first object recognition result predicted by a first neural network model using, as an input, a first image captured by a first camera facing a space including at least one object from a first viewpoint, obtain, through the communication unit, a second image captured by a second camera facing the space from a second viewpoint, obtain a label for the second image by converting the obtained first object recognition result, based on a conversion relationship between a first camera coordinate system corresponding to the first camera and a second camera coordinate system corresponding to the second camera, generate training data by performing labeling, using the obtained label for the second image, on the second image corresponding to the first image, based on the first object recognition result converted with respect to the second viewpoint, and train a second neural network model by using the generated training data.

20. The cloud server of claim 19, wherein the at least one processor is further configured to execute the at least one instruction to transmit, through the communication unit, network parameter values of the trained second neural network model to an electronic device with the second neural network model.

* * * * *